United States Patent
Brooks et al.

(10) Patent No.: US 10,274,327 B2
(45) Date of Patent: Apr. 30, 2019

(54) CONFIGURABLE ROUTES

(71) Applicant: FastZach, LLC, Minneapolis, MN (US)

(72) Inventors: Amanda S. Brooks, Minneapolis, MN (US); Taylor J. Sampson, Shakopee, MN (US)

(73) Assignee: FastZach, LLC, Minneapolis, MN (US)

( * ) Notice: Subject to any disclaimer, the term of this patent is extended or adjusted under 35 U.S.C. 154(b) by 211 days.

(21) Appl. No.: 15/394,172

(22) Filed: Dec. 29, 2016

(65) Prior Publication Data

US 2018/0188065 A1 Jul. 5, 2018

(51) Int. Cl.
| | |
|---|---|
| G01C 21/34 | (2006.01) |
| G01C 21/36 | (2006.01) |
| G01C 21/20 | (2006.01) |
| G01S 19/19 | (2010.01) |

(52) U.S. Cl.
CPC ............ *G01C 21/343* (2013.01); *G01C 21/20* (2013.01); *G01C 21/3476* (2013.01); *G01C 21/3667* (2013.01); *G01S 19/19* (2013.01)

(58) Field of Classification Search
CPC ........ G01C 21/20; G01C 21/26; G01C 21/34; G01C 21/3407; G01C 21/343; G01C 21/3453; G01C 21/3461; G01C 21/3476; G01C 21/3484; G01C 21/3614; G01C 21/3605; G01C 21/3667; G01C 21/3676; G01C 22/00; G01S 19/19; A63B 2220/12; A63B 24/0075; A63B 24/0062; A63B 69/0028
See application file for complete search history.

(56) References Cited

U.S. PATENT DOCUMENTS

| | | |
|---|---|---|
| 4,848,780 A | 7/1989 | Straub |
| 5,938,720 A | 8/1999 | Tamai |
| 6,013,007 A | 1/2000 | Root et al. |
| 6,032,108 A | 2/2000 | Seiple et al. |
| 6,513,532 B2 | 2/2003 | Mault et al. |
| 6,545,637 B1 | 4/2003 | Krull et al. |
| 6,657,558 B2 | 12/2003 | Horita et al. |
| 6,687,615 B1 | 2/2004 | Krull et al. |

(Continued)

OTHER PUBLICATIONS

Garmin, "Forerunner 101", http://www.garmin.com/products/forerunner101, 2 pgs. (© 1996-2004).

(Continued)

*Primary Examiner* — Spencer D Patton

(74) *Attorney, Agent, or Firm* — Brooks, Cameron & Huebsch, PLLC

(57) ABSTRACT

An example configurable route based on a distance input includes causing a device to access location relevant cartographic data and present the location relevant cartographic data on a display on the device. The instructions are executable to receive a plurality of input selections to the location relevant cartographic data, convert the plurality of input selections to a plurality of coordinates, receive a distance input and deliver the plurality of coordinates and the distance input to a routing algorithm, and to receive a route generated therefrom that begins at a starting location and ends at the starting location and has a length substantially equal to the distance input.

23 Claims, 19 Drawing Sheets

(56) References Cited

U.S. PATENT DOCUMENTS

| | | | |
|---|---|---|---|
| 6,736,759 B1 | 5/2004 | Stubbs et al. | |
| 6,759,970 B1 | 7/2004 | Horita et al. | |
| 6,795,769 B2 | 9/2004 | Kaji et al. | |
| 6,816,781 B2 | 11/2004 | Imanishi | |
| 6,941,222 B2 | 9/2005 | Yano et al. | |
| 6,947,834 B2 | 9/2005 | Duckek | |
| 6,950,746 B2 | 9/2005 | Yano et al. | |
| 7,162,363 B2 | 1/2007 | Chinitz | |
| 7,480,512 B2 | 1/2009 | Graham et al. | |
| 7,805,149 B2 | 9/2010 | Werner et al. | |
| 7,805,150 B2 | 9/2010 | Graham et al. | |
| 8,068,858 B2 | 11/2011 | Werner et al. | |
| 8,543,326 B2 | 9/2013 | Zarem et al. | |
| 8,579,767 B2 | 11/2013 | Ellis et al. | |
| 8,655,583 B2 | 2/2014 | Nesbitt | |
| 8,681,635 B2 | 3/2014 | Nesbitt et al. | |
| 8,725,276 B2 | 5/2014 | Ellis et al. | |
| 8,781,729 B2 | 7/2014 | Nesbitt et al. | |
| 8,814,755 B2 | 8/2014 | Ellis et al. | |
| 8,858,399 B2 | 10/2014 | Ellis et al. | |
| 8,924,148 B2 | 12/2014 | Nesbitt et al. | |
| 8,929,465 B2 | 1/2015 | Lee et al. | |
| 8,954,274 B2 | 2/2015 | Nesbitt | |
| 8,968,156 B2 | 3/2015 | Ellis et al. | |
| 8,977,497 B2 | 3/2015 | Nesbitt | |
| 9,068,837 B2 * | 6/2015 | Holsinger | G01C 21/00 |
| 9,157,758 B2 | 10/2015 | Van Seggelen et al. | |
| 9,415,267 B2 | 8/2016 | Ellis | |
| 9,423,262 B2 | 8/2016 | Nesbitt | |
| 9,430,510 B2 | 8/2016 | Laurenzo et al. | |
| 2001/0025221 A1 | 9/2001 | Klein | |
| 2001/0025222 A1 | 9/2001 | Bechtolsheim et al. | |
| 2004/0088392 A1 | 5/2004 | Barrett et al. | |
| 2005/0131581 A1 | 6/2005 | Sabe et al. | |
| 2006/0085106 A1 | 4/2006 | Gaudiano et al. | |
| 2006/0167622 A1 | 7/2006 | Bodin et al. | |
| 2006/0183603 A1 | 8/2006 | Astilean | |
| 2006/0206258 A1 * | 9/2006 | Brooks | G01C 21/34 |
| | | | 701/439 |
| 2006/0217127 A1 | 9/2006 | Drane | |
| 2007/0073897 A1 | 3/2007 | Sasaki | |
| 2007/0106468 A1 | 5/2007 | Eichenbaum et al. | |
| 2007/0271034 A1 | 11/2007 | Perry | |
| 2007/0288156 A1 | 12/2007 | Neff et al. | |
| 2008/0009275 A1 * | 1/2008 | Werner | A63B 24/0062 |
| | | | 455/414.2 |
| 2008/0021632 A1 | 1/2008 | Amano | |
| 2008/0027639 A1 | 1/2008 | Tryon | |
| 2011/0130955 A1 * | 6/2011 | Pu | G01C 21/20 |
| | | | 701/533 |
| 2015/0241225 A1 | 8/2015 | Liu et al. | |
| 2016/0358471 A1 | 12/2016 | Hajj et al. | |
| 2016/0365072 A1 * | 12/2016 | Blumenberg | G01C 21/367 |

OTHER PUBLICATIONS

Timex, "59551", http://www.timex.com/bin/detail.tmx?item=048148595514, 1 pg. (© 1997-2004).

Garmin, "Forerunner 301", Runner's World, May 2005, p. 41, vol. 40 No. 5.

Nike Incorporated, Nike Map It, http://nikeplus.nike.com/nikeplus/?locale=en_us&l=mapit, accessed Aug. 4, 2008, 1 page.

Endmondo, https://www.endomondo.com/, accessed Oct. 23, 2018, 1 page.

Strava, https://www.strava.com/, accessed Oct. 23, 2018, 1 page.

MapMyRun, http://www.mapmyrun.com/, accessed Oct. 23, 2018, 1 page.

Runtastic, https://www.runtastic.com/, accessed Oct. 23, 2018, 1 page.

Runraegis, http://www.runraegis.com/, accessed Oct. 23, 2018, 1 page.

RunGo, https://www.rungoapp.com/, accessed Oct. 23, 2018, 1 page.

Garmin fēnix® 5, https://buy.garmin.com/en-US/US/p/552982, accessed Oct. 23, 2018, 3 pages.

DC Rainmaker, "Hands-on: Garmin's New Fenix 5 Multisport GPS Series—with mapping!", https://www.dcrainmaker.com/2017/01/hands-on-garmins-new-fenix-5-multisport-gps-serieswith-mapping.html, accessed Oct. 23, 2018, 1 page.

* cited by examiner

US 10,274,327 B2

CONFIGURABLE ROUTES

INTRODUCTION

Route planning programs and devices are well known in the field of navigational instruments. Existing route generation programs are able to map out a route between two or more different locations. That is, existing routing algorithms can execute instructions in conjunction with cartographic data to generate a route once the program is given a particular destination address. These programs may also require the user to input their starting position. Other times, a device may use global positioning system (GPS) technology to register the device's starting location. Either way, existing routing algorithms will not generate a route unless a destination different from the device's starting location is provided. The resultant route can be displayed as a path on a printable map or a display on the device and can incorporate landmarks, streetnames, sequential turning instructions, etc.

In some devices GPS technology can be continuously used to update the location of the device. One aspect common to these existing navigational programs and devices is that the underlying programs require a destination address different from the starting location.

DETAILED DESCRIPTION

Example implementations relate to a configurable route based on a distance input. One example embodiment includes a computer readable medium having program instructions stored thereon that are executable by a processing resource to cause a device to access location relevant cartographic data and present the location relevant cartographic data on a display on the device. Location relevant cartographic data, as the same is referred to herein, is intended to mean cartographic data relevant to a current position of the device and/or cartographic data relevant to a selected location where a user may want to traverse a route.

According to embodiments, the program instructions are executable to receive a plurality of input selections to the location relevant cartographic data, convert the plurality of input selections to a plurality of coordinates, receive a distance input and deliver the plurality of coordinates and the distance input to a routing algorithm.

The instructions are executable to receive a route generated from the routing algorithm that includes two or more of the plurality of coordinates, begins at a starting location and ends at the starting location and has a length substantially equal to the distance input. In some embodiments the route begins and ends at the starting location within a threshold distance. The instructions are executable to present the generated route on the display on the location relevant cartographic data and receive location information from a GPS receiver on the device to track the device along the route. Embodiments include electronic devices standing alone, portable electronic devices connected to a network, wireless wearable electronic devices having GPS capabilities.

Figure 1A:
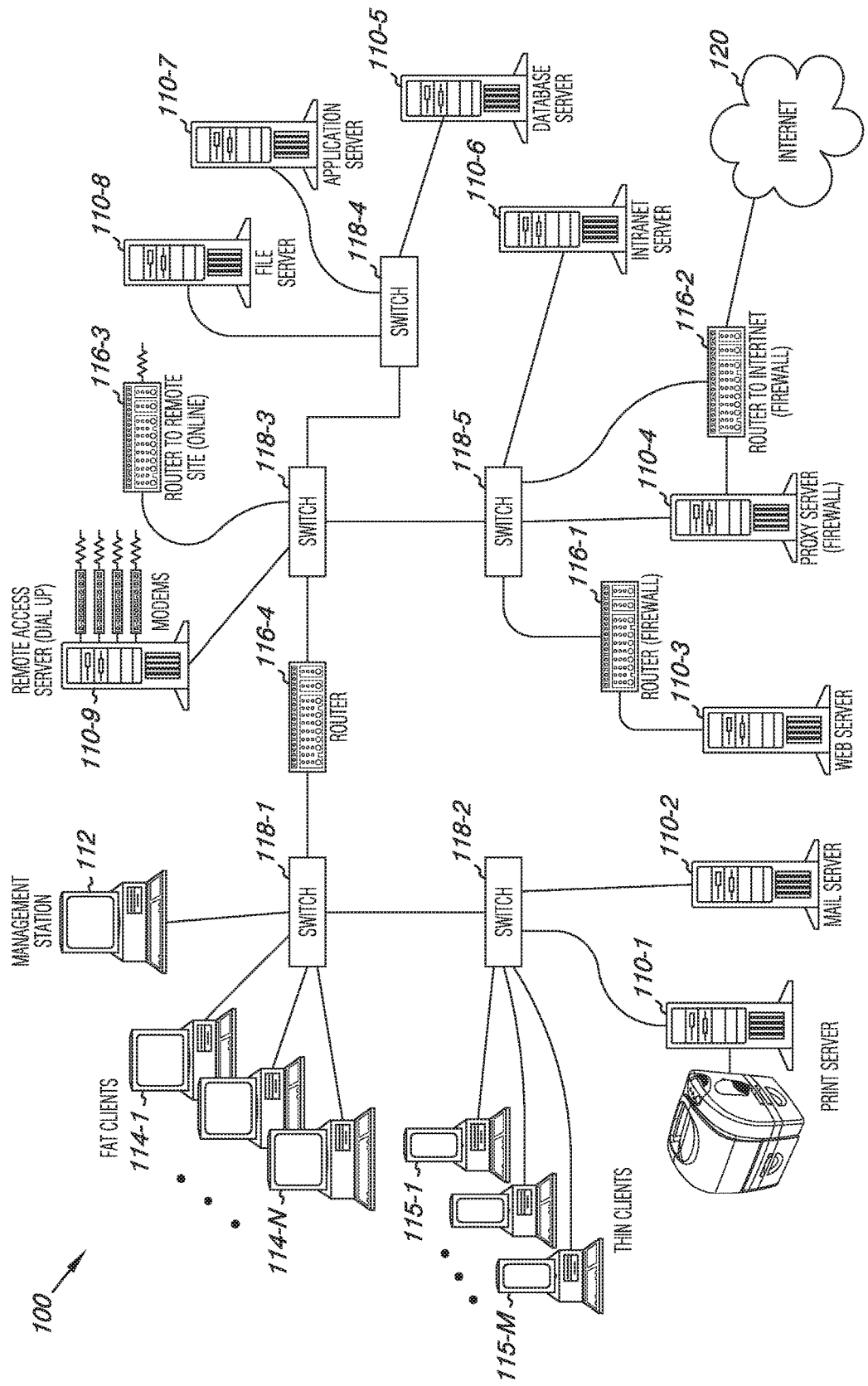
FIG. 1A illustrates an example of a network, in accordance with the present disclosure.

FIG. 1A illustrates a network 100 in which the program instruction embodiments can be implemented. As shown in FIG. 1A, a number devices, e.g., PCs, servers, peripherals, etc., can be networked together via a local area network (LAN) (e.g., an Ethernet network), a wide area network (WAN), a wireless local area network (WLAN) the public switched telephone network (PSTN), and/or the Internet using transmission control protocol/Internet protocol (TCP/IP) via routers, hubs, switches and the like (referred to herein as "network devices").

The embodiment of FIG. 1A illustrates clients and servers in a WAN, LAN, WLAN, etc. However, embodiments of the invention are not so limited. For example, the embodiment of FIG. 1A shows various servers for various types of service on the network. The servers illustrated in the network of FIG. 1A can be of various types including third party servers, local network servers, database servers, application servers, routing servers, cartographic database servers, municipal and/or other government servers, authentication servers, etc. For example, by way of illustration and not by way of limitation, servers can include a print server 110-1 to handle print jobs for the network 100, a mail server 110-2, a web server 110-3, a proxy server (firewall) 110-4, a database server 110-5, and intranet server 110-6, an application server 110-7, a file server 110-8, and a remote access server 110-9, etc. Again, the examples provided here do not provide and exhaustive list.

As an example, a third party server connected to the network 100 can receive data from another network device connected to the network through a remote access server 110-9. Receiving data from another device connected to the network can include receiving data that has been authenticated and authorized through a proxy server 110-4. Authenticating and authorizing a network device to access the network 100 may include executing instructions to verify a user identification (UID) and password. Authenticating and authorizing a network device to access the network 100 can allow access to other servers on the network 100 such as an application server 110-7, database server 110-5, file server 110-8 and/or other server on the network 100.

The embodiment of FIG. 1A further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, portable multifunction devices, e.g., wearable electronic devices and/or smartphones, PC tablets, cellphones, and the like. The fat and/or thin client can include a device having the program embodiments (e.g., program instructions) discussed in more detail below.

The designators "N" and "M" are used to indicate that a number of fat or thin clients can be attached to the network 100. The number that N represents can be the same or different from the number represented by M. The embodiment of FIG. 1A illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. Embodiments of the invention, however, are not limited to the number and/or type of network devices in FIG. 1A's illustration. The network of FIG. 1A is further illustrated connected to the Internet 120 via router 116-2. In some embodiments the network can provide at least part of a social media computing network allowing content sharing between network devices connected to the network in either a wired and/or wireless manner.

As one of ordinary skill in the art will appreciate, many of these devices include processor and memory hardware. By way of example and not by way of limitation, the network management station 112 will include a processing resource and memory resource as the same are well known to one of ordinary skill in the art. Similarly, fat and thin clients as well as the network devices of routers, 116-1, 116-2, 116-3, and 116-4, and hubs and/or switches 118-1, 118-2, 118-3, 118-4, and 118-5 can include processing and memory resources. Embodiments of the invention are not limited, for the various devices in the network, to the number, type or size of processing and memory resources. Program instructions can also be transmitted on a carrier wave using any number of RF technologies, e.g., Wi-Fi, Bluetooth, etc.

Computer executable instructions (e.g., program instructions), as described in more detail below, can reside on the various network devices. For example, program instructions in the form of firmware, software, etc., can be resident on the network 100 in the memory of a network management station 112, in the memory of the number of "fat" clients 114-1, . . . , 114-N, in the memory of the number of "thin" clients 115-1, . . . , 115-M (e.g., wearable electronic devices, smartphones) as a downloadable application, in the memory of one or more routers, 116-1, 116-2, 116-3, and 116-4, in the memory of hubs and/or in the memory of switches 118-1, 118-2, 118-3, 118-4, and 118-5, and such program instructions can be executed by the processing resources thereon. As the reader will appreciate, program instruction embodiments and processing resources can be resident in a number of locations on various network devices in the network 100 as employed in a distributed computing network, e.g., cloud computing environment.

Embodiments within the scope of the present invention include computer-readable media having computer-executable instructions or data fields storable thereon. Such computer-readable media can be any available media which can be provided with particularly configured program instruction embodiments to cause a device to perform as a special purpose computing device. By way of example, and not limitation, such computer-readable media can comprise non-volatile memory (e.g., Flash memory), RAM, ROM, EEPROM, CD-ROM or other optical disk storage, magnetic disk storage or other magnetic storage devices, solid state drives (SSDs) or any other medium which can be used to store the particularly configured program instruction embodiments to cause a device to perform as a special purpose computing device. Combinations of the above are also included within the scope of computer-readable media.

Computer-executable instructions include, for example, instructions to cause an electronic device, e.g., wireless wearable device, portable electronic device (e.g., fitness bands, smart watches, smart apparel, smart glasses, smartphones, etc.) to perform a certain function or group of functions, routines, etc. In some contexts, the computer-executable instructions are described as program instructions executable by a processor resource on and electronic device. Program instruction embodiments include routines, programs, objects, data structures, etc. that perform particular tasks. As used herein, an electronic device can include wireless wearable devices, portable electronic device (e.g., fitness bands, smart watches, smart apparel, smart glasses, smartphones, etc.), PDAs, PC tablets, cellular phones, laptops, desktops, Blackberries, MP3 players, etc.

As provided herein, program instructions are not limited to program instructions written in any particular language. Nor are the program instruction embodiments limited to any particular operating environment.

Figure 1B:
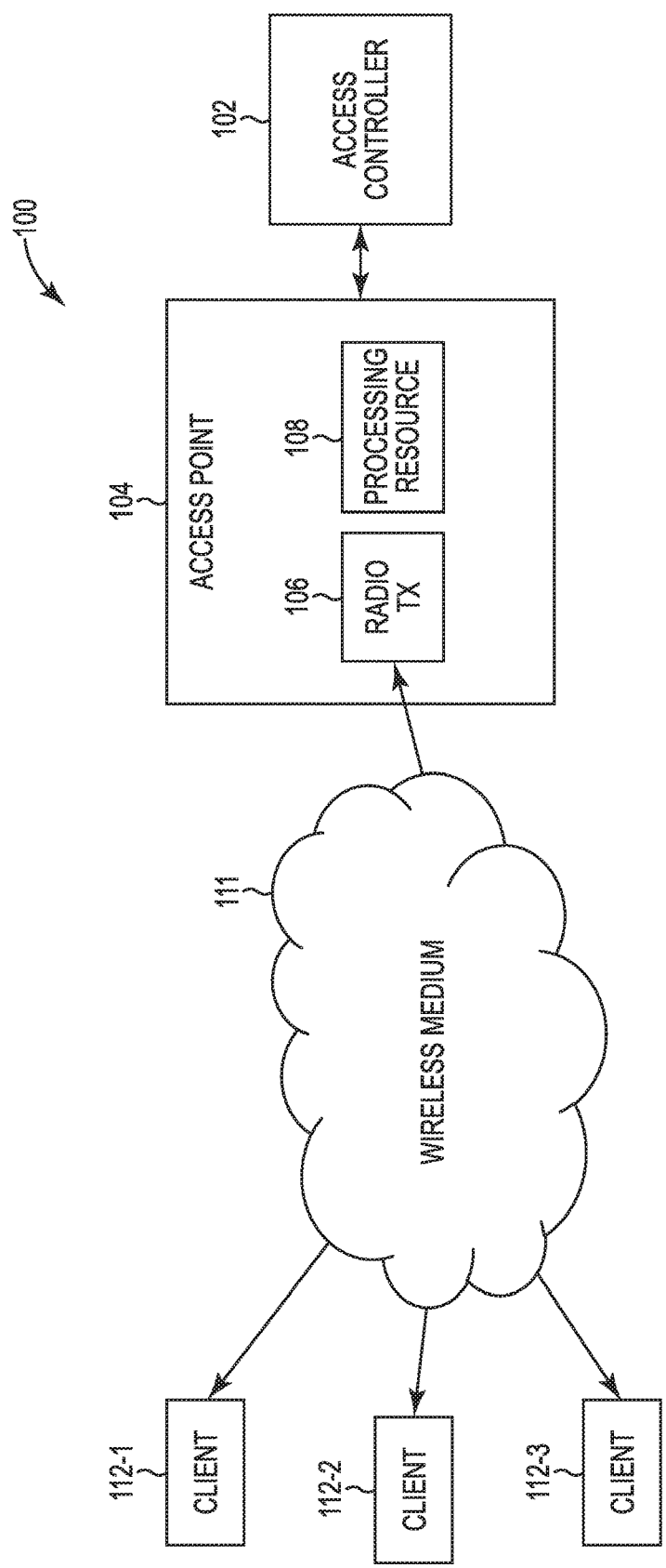
FIG. 1B illustrates an example environment for wireless network connection, in accordance with the present disclosure.

FIG. 1B illustrates an example environment 100 for wireless network connection, in accordance with the present disclosure. In some examples, the wireless environment 100 can be a network such as a wireless local area network (WLAN), wireless wide area network (WWAN), Wi-Fi, Bluetooth®, the Internet, etc., among other types of wireless networks. The environment 100 can be a network to exchange data packets, binary (bit) data streams, or other types of communication between computing devices, e.g., any of the electronic devices described above.

In some examples, the environment 100 can include a number of client devices 112-1, 112-2, 112-3. As used herein, client devices can include computing devices, as described above, that include computing hardware such as processing and memory resources to execute computer executable instructions to access a service such as a service provided by a server shown in FIG. 1A. The client devices 112-1, 112-2, 112-3 can be computing devices that are communicatively coupled to a wireless medium 111. As used herein, a wireless medium 111 can include a space between the client devices 112-1, 112-2, 112-3 and an access point 104. In some examples, the wireless medium 111 a number of additional access points and/or a network apparatus (relays, cell towers, repeaters, etc.) to communicatively couple the client devices 112-1, 112-2, 112-3 to the access point 104 may be provided.

As used herein, an access point 104 can include a wireless access point (WAP) that includes networking hardware to connect to a network such as network 100 shown in FIG. 1A. In some examples, the access point 104 can include a radio 106 and/or a processing resource 108. In some examples, the radio transceiver 106 can be utilized to wirelessly communicate with other network devices. For example, the radio transceiver 106 can wirelessly send and/or receive data packets from other network devices. As used herein, one network device can include a device that is adapted to transmit and/or receive signaling and to process information with a client device in such wireless wearable devices, portable electronic device (e.g., fitness bands, smart watches, smart apparel, smart glasses, smartphones, etc.), PDAs, PC tablets, cellular phones, laptops, desktops, Blackberries, MP3 players, etc., another access point, a data transfer devices (such as network switches, routers, controllers, etc.) or the like. In some examples, the radio transceiver 106 can also be utilized to receive communication requests from a plurality of devices such as the client devices 112-1, 112-2, 112-3.

The radio transceiver 106 can be coupled to a processing resource 108, e.g., application specific integrated circuit (ASIC), processor, etc. In some examples, the processing resource 108 can be connected to an access controller 102. The processing resource 108 and/or access controller 102 can be utilized to manage or receive instructions to manage the access point 104.

A network device such as an access point, a client device, a controller can utilize a protocol. In some examples, the processing resource 108 and/or access controller 102 can utilize enhanced distributed channel access (EDCA) protocol for managing traffic associated with the access point 104. In some examples, the access point 104 can communicate with a plurality of client devices. For example, the access point 104 can be communicatively coupled to client devices 112-1, 112-2, 112-3 and other network devices across a wireless medium 111.

Figure 2A:
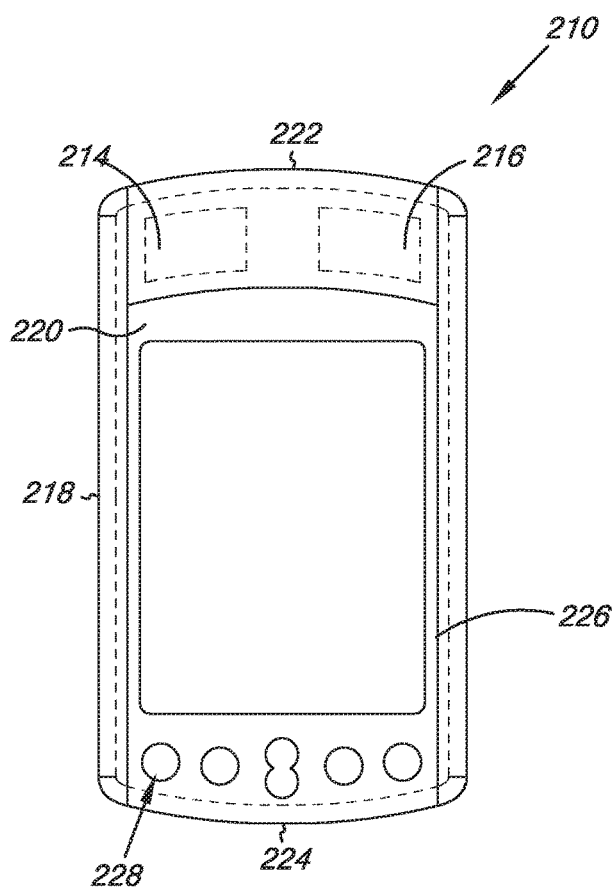
FIG. 2A illustrates an example of an electronic device which can include program embodiments described herein.

FIG. 2A illustrates a device which can include program instruction embodiments for producing a route based on a distance input. Device 210 shown in FIG. 2A can represent a personal digital assistant (PDA), a cellphone, MP3 player, iPod, Blackberry or other similar handheld multifunctional device. By way of example and not by way of limitation the device 210 could operate with a wireless operating system (OS) such as the Android® OS, the Apple® iOS®, etc. The device of FIG. 2A is shown with a GPS patch antenna 214 and a cellular antenna 216 internally contained within a housing 218. However, not all embodiments of the current invention have these features as neither feature is essential for generating a route based on a distance input. In the embodiment of FIG. 2A the housing 218 is illustrated in a rectangular shape with a low profile that has a front face 220 extending from a top end 222 to a bottom end 224. Mounted on front face 220 is a display screen 226, which is touch sensitive and responsive to a stylus 230 (shown stored in the side view of FIG. 2B) or a finger touch. FIG. 2A illustrate the stylus 230 nested within housing 218 for storage and convenient access in a conventional manner. The embodiment shown in FIG. 2A illustrates a number of control buttons, or input keys 228 positioned toward the bottom end 224. Embodiments, however, are not so limited and one of ordinary skill in the art will appreciate that the input keys 228 can be positioned toward the top end 222 or at any other suitable location.

It should be understood that the structure of GPS integrated device 210 is shown as illustrative of one type of integrated PDA, smartphone and/or wearable electronic navigation device. Other physical structures, such as a cellular telephone, bike mounted device, wrist mounted device or any device that can be carried or worn are contemplated within the scope of this invention and can be used with the program embodiments described herein.

Figure 2B:
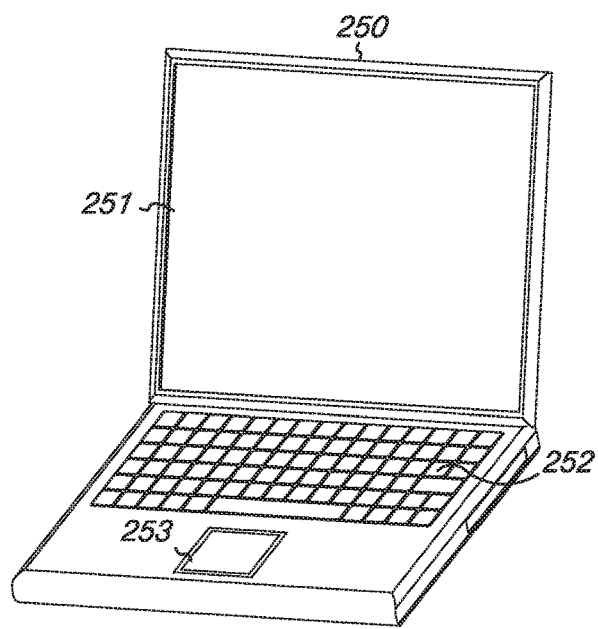
FIG. 2B illustrates another example of an electronic device which can include program embodiments described herein.

FIG. 2B illustrates another device which can include program instruction embodiments for producing a route based on a distance 250. Device 250 shown in FIG. 2B includes a laptop computer. By way of example and not way of limitation the laptop computer can include an operating system (OS) such as Windows, Mac, Linux, etc. As shown in FIG. 2B the laptop has a screen 251 for displaying information, a keyboard 252 and touch sensitive pad 253 for inputting data and manipulating the laptop computer. Other physical structures, such as desktop computers and servers, are contemplated within the scope of this invention.

Figure 3A:
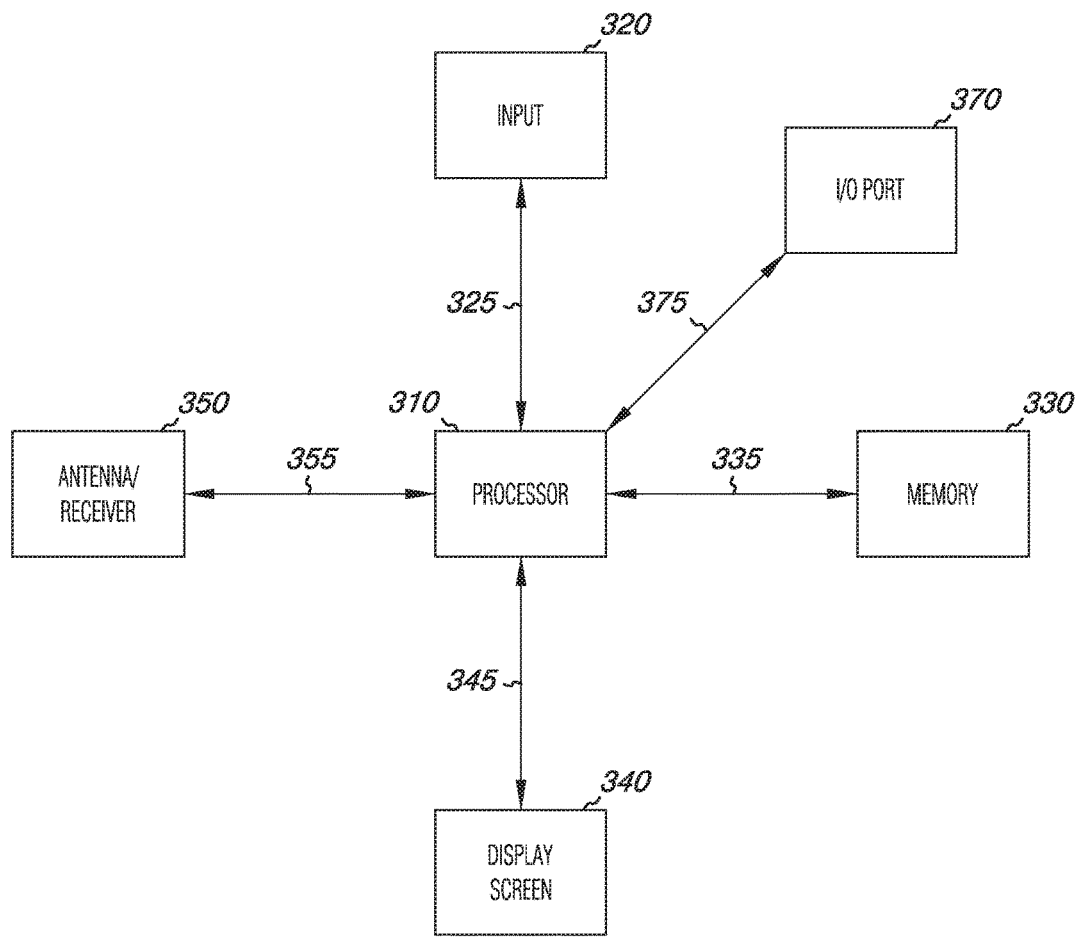
FIG. 3A is a block diagram example of the electronic components which can be included in the devices shown in FIGS. 2A-2B.

FIG. 3A is a block diagram of example electronic components which can be included in the devices shown in FIGS. 2A-2B. In the embodiment shown in FIG. 3A, the electronic components include a processor 310 which is connected to an input 320, such as a keypad, via line 325. It will be understood that input 320 may include a microphone for receiving voice commands. Processing resource, e.g., processor 310, communicates with memory 330 via line 335, e.g., electrical and/or optical circuit connection. Memory 330 can include program instructions for generating a route based on distance and other selectable criteria. Processor 310 also communicates with display screen 340 via line 345, e.g., electrical and/or optical circuit connection. An antenna/receiver 350, such as a GPS antenna/receiver, is connected to processor 310 via line 355, e.g., electrical and/or optical circuit connection. It will be understood that the antenna and receiver, designated by reference numeral 350, are combined schematically for illustration, but that the antenna and receiver may be separately located components, and that the antenna may be a GPS patch antenna or a helical antenna. Additionally, the antenna and receiver shown can be part of a transmitter and receiver, e.g., transceiver, combined circuitry. The electronic components further include I/O ports 370 connected to processor 310 via line 375. Processor 310, memory 330, and display 340 can include any type of processing resource, memory, and display capability in the art of computing devices. FIG. 3A could also represent some of the hardware components of laptop (FIG. 2B), smartphone, smart watch, or any electronic computing device described herein. Embodiments, however, are not limited to the examples illustrated in FIG. 3A.

Figure 3B:
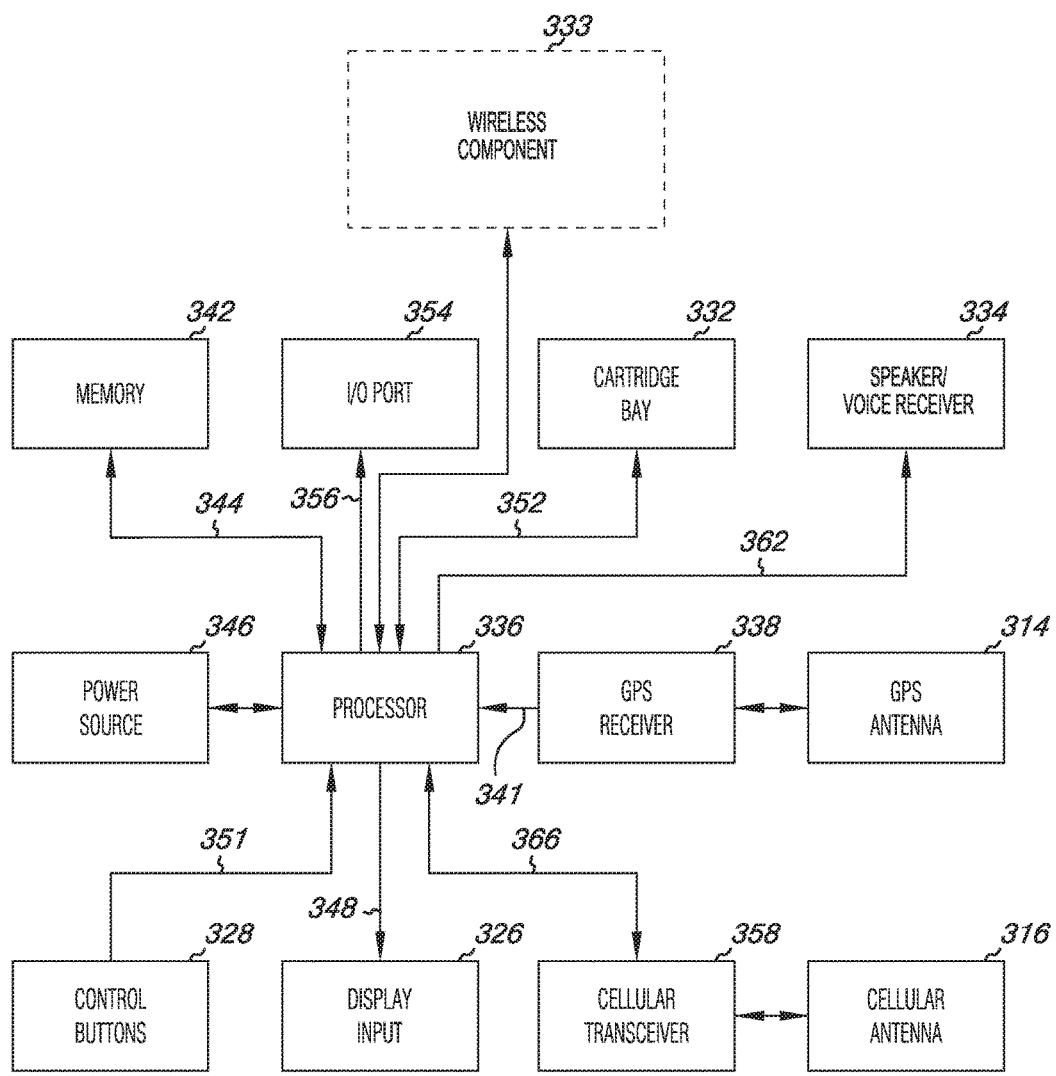
FIG. 3B is a block diagram providing another example of the electronic components which can be included in the devices shown in FIGS. 2A-2B.

FIG. 3B is a block diagram providing another example of the electronic components which can be included in the devices shown in FIGS. 2A-2B. The electronic components shown in FIG. 3B include a processing resource, e.g., processor 336, which is connected to the GPS antenna 314 through GPS receiver 338 via line 341. The processor 336 interacts with an operating system (such as the examples given above) that runs selected software depending on the intended use of the embodiment. Processor 336 is coupled with memory 342 via line 344, and power source 346 for powering the electronic components. The processor 336 communicates with touch sensitive display screen 326 via data line 348. Processing resource 336, memory resource 342, and display 326 can include any type of processing resource, memory resource, and display resource capability in the art of computing devices.

The electronic components can further include other input sources that are connected to processor 336. Control buttons 328 are connected to processor 336 via line 351 and a data cartridge can be inserted into cartridge bay 332 and can be connected via line 352. Those in the art will appreciate that data cartridge can include any computer readable medium, including ROM, RAM, flash memory, hard drives, floppy discs, memory cards, memory keys, optically readable memory, and/or some other types of volatile and/or non-volatile memory. An I/O port 354, e.g., serial I/O, SATA, etc., can be connected to the processor 336 via line 356. Cellular antenna 316 is connected to cellular transceiver 358, which is connected to the processor 336 via line 366. Processor 336 can be connected to a speaker/voice receiver component 334 via line 362. The electrical components illustrated in FIG. 3B may also include a wireless connection, e.g., infrared (IR), Bluetooth®, WiFi, WiGig, etc., to a wireless component 333 and be coupled to the processor 336 and memory resources 342. For example, the wireless component can include wireless headphone, e.g., earbuds. The wireless connection can be used to communicate information, e.g., audible and/or visual data, from one device to another component and/or device.

The electronic components shown in FIGS. 3A and 3B can be powered by any power source as the same will be known and understood. Different configurations of the components shown in FIGS. 3A and 3B can be included with the embodiments described herein. For example, in some embodiments, the components shown in FIGS. 3A and 3B are in communication with one another via wireless connections and the like.

Exemplary Route Embodiments

FIGS. 4A-4G illustrate example routes generated by various program embodiments described herein. As the reader will appreciate, the program instructions may be resident and executed in various locations on a network such as illustrated in FIG. 1, on a device such as illustrated in FIGS. 2A and 2B, or a combination thereof. For example, in one embodiment cartographic data and program instructions to generate a route based on a distance input can be stored in the memory of a stand alone portable device such as those shown in FIGS. 2A and 2B. Alternatively, a portable device such as shown in FIGS. 2A and 2B can be connected in a wired and/or wireless fashion to a larger network and/or system, e.g., local area network (LAN), wide area network (WAN), etc. In such embodiments, the cartographic data and program instructions can be stored elsewhere in the larger network and/or system and accessible in the wired and/or wireless fashion therefrom. In such embodiments, the cartographic data and program instructions can be downloaded to the portable device for execution of the program instructions to generate a route based on a distance input along with the received cartographic data. Likewise, the distance input can be uploaded to the larger network and/or system where the program instructions, located elsewhere in the larger network and/or system, are executed based on the received distance information along with the cartographic data.

Combinations of these examples are similarly considered within the scope of the present invention. And, the embodiments are not limited to the examples listed above. That is program instructions executable according to the present embodiments need only be accessible by a user at some location, whether via cellphone, smartphone, PDA, portable electronic device, e.g., wireless wearable electronic device, laptop, desktop, etc., capable of receiving a distance input. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

Figure 4A:
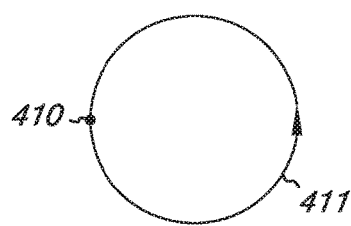
FIGS. 4A-4G a number of example routes which can be generated according to the program embodiments described herein.

FIG. 4A is representative of a route embodiment, based on a selectable distance input, generated by program instructions storable in a memory and executable by a processor. In the embodiment shown in FIG. 4A, the route 411 begins at a starting location 410 and ends at the starting location 410, the route covering a distance substantially corresponding to the selectable distance input. For example, as described above, program instructions executing on a device can receive a selectable distance input and generate the route based on the distance input along with available cartographic data and a chosen starting location. In some embodiments, the starting location is a location of the device, either input by a user or selected by the program instructions interacting with GPS information. In other embodiments, the starting location is a different location from the location of the device receiving the distance input. In these embodiments the starting location can be input by the user, e.g., by speaking or typing in a street address, using a stylus or touchscreen display, selecting a location from among cartographic information, etc.

For example, a user looking to go for a walk, hike, run, etc., could enter, i.e., input, their present location, e.g., street address, into a device, such as shown in FIGS. 2A, 2B, and/or connected to a network such as FIG. 1 or FIG. 5 (discussed in more detail below). The user can additionally enter a distance they would like to traverse, e.g., 2 miles. The program instructions can execute to receive the starting location information and the distance information. The program instructions are further executable to generate a route based on the starting location information, the distance information and accessible cartographic information. By way of example, in FIG. 2A a user may have entered their home street address and a distance of two miles. GPS may also have been used to identify the user's home street address as the location of a device where a user is accessing the program instructions and the user may have simply selected this information be used as the starting location. In one embodiment, the program instructions can be executed by the user without any additional input information being entered by the user. In such embodiments, such as can be represented by FIG. 2A, the program instructions will execute to generate a route which traverses the selected distance and returns upon completion of that distance to the starting location.

Thus, a user of a laptop and/or desktop computer having program embodiments storable and executable thereon could receive a route such as shown in FIG. 2A which if followed would take them from their present location, e.g., starting (or "first") location 410, traversing a path (route) equaling a distance of two (2) miles before returning them to their starting location 410. The route could include repeating the illustrative loop a certain number of times before the selected distance is achieved and completed at the starting location 410. The route can be displayed as a map and/or as a sequential series of distances and turning instructions on a display of the device. The user could then memorize, write down, print out or by some other means capture this information and traverse the route represented in FIG. 4A.

As noted above, the program instruction embodiments do not have to be resident on a laptop and/or desktop, but additionally could be resident on a portable electronic device, e.g., wearable electronic device, smartphone, PDA, or other wireless electronic device having processing and memory resources, or accessible from any of the above over a network such as shown in FIG. 1 and described below in FIG. 5. The generated route can be displayed using such devices and carried with the user while they are traversing the route. In the embodiments where the device includes GPS capabilities, the device could additionally display the device's location as the device moves along the route. In some GPS enabled embodiments, as the same are known in the art, the device could even issue audible and/or text instructions if the device deviates from the route. Likewise, according to some embodiments (discussed in more detail below), program instructions can execute to issue audible and/or text instructions of interests to a user of the device as the device moves along the route. For example, program instructions can execute to provide recorded, audible and/or text instructions as motivation and/or suggestions. In some embodiments, the program instructions execute to allow a user to select and/or record key phrases, music, video, etc. which a user may enable or disable, As noted, embodiments are not limited to the above described additional features. The reader will appreciate that a user of the program embodiments can benefit from simply seeing the route generated and displayed in any of the above scenarios and then proceeding to traverse the route from the user's memory and personal recollection without more. Additionally, the user of the program embodiments can print the route, using any attachable/available printing mechanism in order to carry the route directions and/or route image in paper form or can transfer the route directions and/or route image to another electronic device (e.g., IR and/or Bluetooth transfer to another wearable electronic device or smartphone) to carry with them as they traverse the route.

As the reader will appreciate, with appropriate cartographic data available, a user can access the program instructions, enter a distance, and a starting location at any global geographic location to generate the above described route. Thus, for example, if a runner, walker, hiker, etc., is traveling to another city on business and/or leisure, e.g., user lives in Minneapolis, Minn. and is traveling to Seattle, Wash., they could enter their lodging address, e.g., hotel, as the starting location along with a desired distance, and the program instructions will execute to generate a route embodiment as illustrated in FIG. 4A or according to any of the other example route embodiments to follow.

Figure 4B:
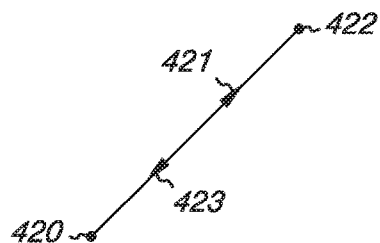

FIG. 4B is representative of another route embodiment generated by program instructions storable in a memory and executable by a processor. In the embodiment of FIG. 4B, the route begins at a starting location 420 and includes; a first leg as indicated by the direction of arrowhead 421, a second location 422, a second leg that retraces the first leg as indicated by the direction of arrowhead 423. According to embodiments, the route will cover a total distance substantially corresponding to a distance input to the program instructions. In some embodiments, the second location 422 can include a location furthest from the starting location 420. Embodiments, however, are not so limited. In this example route embodiment, the user, e.g., walker, hiker, runner, biker, driver, boater, canoe/kayaker, etc., may only be looking to traverse a particular distance and is not concerned about any other selectable parameters/criteria (as discussed in more detail below). As such, the route embodiment illustrated in FIG. 4B shows an "out-and-back" scenario, i.e. going out to a location half the distance input and then returning to the starting location.

Figure 4C:
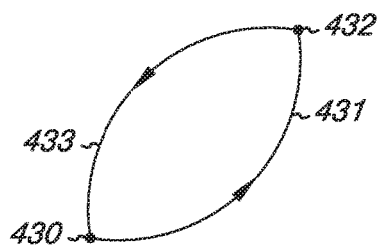

FIG. 4C is representative of another route embodiment generated by program instructions storable in a memory and executable by a processor. In the embodiment of FIG. 4C, the route begins at a starting (or "first") location 430 as the same has been described herein. The route embodiment of FIG. 4C includes a first leg 431, a second location 432 at a different location from the first location 430, and a second leg 433 that is different from the first leg 431. In the embodiment of FIG. 4C the route completes, i.e., ends, once again at the starting location 430, and covers a total distance substantially corresponding to the distance input. In this example the first leg 431 could cover a distance shorter than, equal to, or greater than the second leg 433. According to embodiments, the second location 432 can include a user selected location, e.g., a "waypoint" as the same are known and referred to in the cartographic arts. The second location can also be determined and chosen by the program instructions in generating the route based on another selectable parameter/criteria input to the program instructions such as a rest stop or waypoint selected by the user in referencing cartographic information.

That is, various program embodiments include instructions which can execute to receive a number (or "set") of other selectable criteria to be used in generating the route. By way of example and not by way of limitation, the selectable criteria can include input which reflects a user's desire to traverse hiking trails, city streets, pedestrian paths, one or more preferred path compositions (e.g., grass, asphalt, dirt, etc.), particular terrain (e.g., hilly, mountain, flat, etc.), and/or elevations (e.g., climbs, descents, and/or combinations thereof). The selectable criteria can also include a user's desire to be proximate to certain safety, geographical, and/or human made features (e.g., forest, lakes, rivers, streams, well lighted roadways, cityscapes, police call box, etc.). The selectable criteria can also include a user's desire to have access to one or more particular facilities along the route. By way of example and not by way of limitation, the one or more particular facilities can include a refreshment facility, a lodging facility, a rest room facility, a shopping facility, etc.

Further, various program embodiments include instructions which can execute to receive input which associates a selectable rating factor with each of the selectable criteria, e.g., high, medium, or low importance. In these embodiments the program instructions can execute to generate the route based on an analysis of the selected criteria and any rating factors associated therewith. For example, it is foreseen that while a user may enter a wide range of selectable criteria and associated rating factors as input to the program instructions, it may be implausible for the program instructions to accommodate all of these user preference in any one particular route while adhering to the distance input.

Thus, as the reader will appreciate, the program instructions execute to best accommodate the selected criteria based on the rating factors associated therewith and based on available cartographic data relating to the area in which the route is being generated. For example, the program instructions can execute to generate a route which has a starting location a quarter (¼) away from a user's present location. As another example, a distance input of five (5) miles may be chosen by a user and the program instructions execute to generate a route which is plus or minus a quarter mile (+/−), e.g., 4.89 miles, based on accommodating selected parameters/criteria, including rating factors, and the available cartographic data. Additionally, various program embodiments include instructions which can execute to allow a user to accept or reject a generated route. For example, the program instructions may execute to generate a route which includes a portion through an area, or by a location, which a user does not wish to traverse. In this scenario, a user can input instructions for the program embodiments to generate another route, avoiding the particular area or location, or even inputting other more specific input information, e.g., the user recognizes that a climb is too steep and subsequently provides input for more level terrain. Similarly, the program instructions can execute to store generated routes for reuse and selection, whether random selection (e.g., cycling through, varying, etc.) or otherwise, at a later time and/or date. Further, such stored routes may be stored according to distance or other classifications and categories, e.g., hill runs, long runs, short runs, etc.

With the above disclosure in mind, the embodiment of FIG. 4C may represent an example where a user input as a selectable criteria the desire to pass by a restroom facility approximately half way through traversing the route, and input the desire to follow a return path to the starting location which is different from simply retracing the route "out-and-back" as shown in FIG. 4B.

Figure 4D:
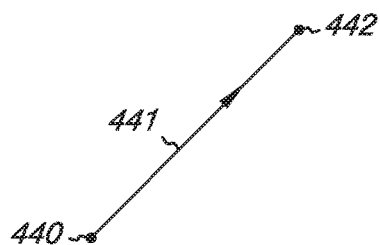

FIG. 4D is representative of another route embodiment generated by program instructions storable in a memory and executable by a processor. In the embodiment of FIG. 4D the route 441 begins at a starting (or "first") location 440 and ends at a second location 442 that is different from the starting location 440. According to the embodiments, the route covers a total distance substantially corresponding to the distance input. However, in this embodiment the user has not elected to return to the starting location 440. As noted earlier, various program embodiments may default to generating a route which completes, after traversing the distance input, at the starting location. As illustrated by FIG. 4D, embodiments are not limited to generating a route which completes at the starting location after accommodating the distance input.

As example of such a scenario would be when a user wishes to traverse a particular distance, but is not dependent on the returning to their location upon completion of traversing the distance. For example, a runner may wish to run five (5) miles toward downtown (which can be a selectable criteria input), but then wishes to stop running and walk around sightseeing, get on an alternative mode of transportation, etc. As another example, a user in a canoe may wish to travel a distance downstream equal to the distance input, but then plans to call a friend to pick them up.

As such various program embodiments can execute to ask the user whether the route is to complete at the starting location. That is, in certain embodiments, returning to the starting location may be a default mode. Still other program embodiments can be included, which can be selected by the user, and which do not default to returning to the starting location. Thus various program embodiments are provided which can override the default mode of returning to the starting location while still accommodating the distance input in generating a route.

Figure 4E:
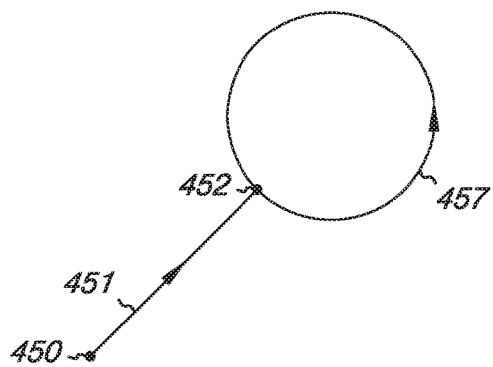

FIG. 4E is representative of another route embodiment generated by program instructions storable in a memory and executable by a processor. The route embodiment of FIG. 4E is similar to some of the features discussed in FIG. 4D in that the route does not complete at the starting location. In the embodiment of FIG. 4E, the route begins at a starting location 450 and includes a first leg 451, a second location 452 different from the first location 450, and a second leg 457 that is different from the first leg 451 and ends at the second location 452. According to embodiments, the route covers a total distance substantially corresponding to the distance input. As described above, the program instructions execute to generate the route embodiment based on a distance input and can execute to attempt to accommodate a number of other user selectable parameters/criteria. As before, the first leg 451 could cover a distance shorter than, equal to, or greater than the second leg 457. Embodiments are not so limited. In this embodiment, the second location 452 can be referred to as a divergence location 452 and the second leg 457 is illustrated as a circular path leading from the divergence location 452 and completing the route back at the divergence location 452. As the reader will appreciate, other user selectable parameters/criteria with or without associated rating factors can include route configurations such as straight-aways, loops, out-and-back, retracing, and other leg or sectional configurations, etc. Such route configurations may also be generated by the program embodiments executing instructions even without a user selectably inputting other parameters/criteria.

One example scenario for the route embodiment of FIG. 4E includes the case where the user has provided a distance input, selected a mode which does not require that the route return to the starting location, and has provided one or more selectable criteria such as a requests for; pedestrian/jogging/running/bike paths, and geographic features such as including creeks, streams, and/or lakes (e.g., or generally water bodies). As described above, each such parameter/criteria could be associated with a rating factor based on a user input, e.g., high, medium, or low, etc., when they enter the particular parameter/criteria. The embodiment shown in FIG. 4E can reflect a route which leads from the starting location, e.g., a user's home street address, to a nearby lake and circles a jogging path around the lake and completing when a distance substantially equal to the distance input has been traversed.

The reader will appreciate, that it is possible for the route to have completed before returning to the divergence location 452 in order to accommodate the distance requested by the user. The reader will further appreciate that it is not altogether necessary for the user to have switched to a mode which purposefully does not return to the starting location 450 to achieve the route embodiment of FIG. 4E. Instead, a user may have simply associated a lower rating factor to this selectable parameter/criteria, i.e., returning to the starting location, than the user associated with another selectable parameter/criteria, i.e., completing a loop around the lake. The reader will also appreciate that the program embodiments may have executed instructions to initially generate a route which went partially around the lake, stopped, and then retraced the previous path in order to accommodate completing the route back at the starting location. Here, the user upon viewing the proposed route may have caused the program instructions to execute to generate a new route this time including additional user input as selectable parameter/criteria in order to have the route completely circle the lake before completing, or as much as possible before the distance input was met.

Figure 4F:
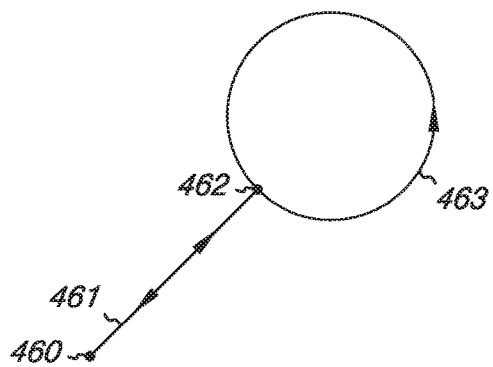

FIG. 4F is representative of another route embodiment generated by program instructions storable in a memory and executable by a processor. In the embodiment of FIG. 4F, the route begins at a starting location 460, includes a first leg 461, a second location 462 (e.g., divergence location), a second leg 463 that converges back to the second location 462, and a third leg that retraces the first leg 461 completing the route back at the starting location 460. Again, the program embodiments will execute instructions to first generate a route that covers a total distance substantially corresponding to an distance input. However, the route embodiment of FIG. 4F may illustrate an example of where the user upon viewing an first proposed route (e.g., which stopped partially around the lake or before returning to the starting location 460) may have caused the program instructions to execute to generate a new route this time including additional user input as a selectable parameter/criteria to change, modify, and/or override the distance input to generate a route which completely circles the lake and which continues until returning to the starting location 460. As the reader will appreciate, program embodiments can execute to provide a user with the option of modifying any of the number of selectable criteria in order to generate a new route. Thus, a user may have initially assigned a "high" rating factor to a selectable criteria of "not retracing any part of the route" and then lessened the rating factor associated therewith, or removed this criteria altogether in executing the program instructions to generate a new route.

The reader will further appreciate that the embodiments include route configurations selected by the user and route configurations not selected by the user but generated based on selected parameters/criteria and/or non-selectable parameters/criteria. For example, the route embodiment of FIG. 4F, the user could have provided a distance input, a request that the route include a park, and that the route concludes at the starting location 460. The route was then generated with leg configurations 461 and 463 with leg 463 including a loop 463 and the third leg, e.g. leg from the divergence location 462 back to the starting location 460, retracing the first leg 461. In this scenario the user did not select these configurations, e.g., the loop and retracing geometries to the route, but rather the loop and retracing legs were generated based on other parameters/criteria, including but not limited to selected parameters/criteria such as distance and the requirement for the route to include a park.

Other parameters/criteria the user may not have selected but were still factored into route generation, such as available roads and pathways, lakes, rivers, and impassible obstacles, etc. For example, as noted above the loop 463 may circumscribe a lake and the third leg may retrace the first leg because that particular portion of the route represents the only available path between the starting location 460 and the divergence location 462, e.g., the only available path while attempting meet selectable criteria such as avoiding highly trafficked vehicle roadways. Likewise the user may have entered the divergence location as a waypoint to expressly include in the route as one of the selectable parameters/criteria.

Figure 4G:
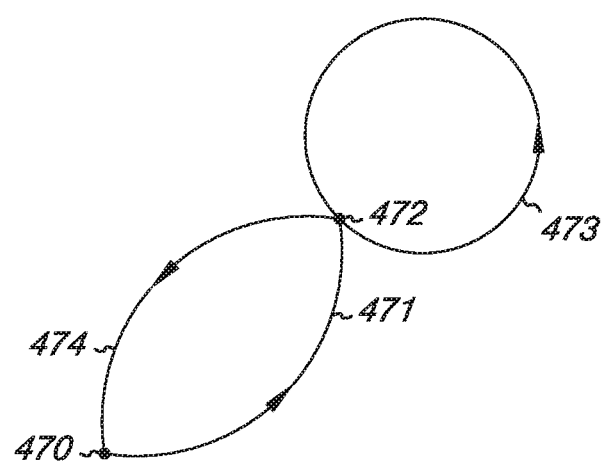

FIG. 4G is representative of another route embodiment generated by program instructions storable in a memory and executable by a processor. In the embodiment of FIG. 4G, the route begins at a first location 470, includes a first leg 471, a second location 472 different from the first location 470, a second leg 473 that is different from the first leg 471 and that converges back to the second location 472, and a third leg 474 that is different from the first leg 471 that ends at the first location 470. According to embodiments, the route covers a total distance substantially corresponding to an distance input. In this example, the first leg 471, the second leg 473 or the third leg 474 could be shorter than, equal to or longer than any of the other legs. Embodiments are not so limited. The embodiment illustrated in FIG. 4G illustrates the manner in which a user can select a waypoint, e.g., second location 472, as a particular location they desire the generated route to include. As noted above, the remaining legs, e.g., 471, 473, and 474 can be generated based on user selected parameters/criteria and/or non-selectable parameters/criteria.

For example, a user could have selected waypoint 472 as a location at a lake, park, etc., that they would like to be proximate to in the route. The program instructions based on this user selectable parameter can continue to generate a route which circles the lake and returns to the waypoint 472. Further, the user can enter as a selectable parameter that they do not wish to retrace any portion of the route. Accordingly, the route is generated to return to the starting location using a final or third leg different from the first leg. Additionally, program instructions can execute to receive a number of different distance inputs to use with each different leg, e.g., 471, 473, and 474. Embodiments are not limited to the examples provided herein. The user will appreciate from reading this description the many variants that are included in the scope of the present invention based on the few examples illustrated above.

As described above, the program embodiments can execute instructions which employ various user selectable parameters/criteria into the route generation process in addition to the distance input. Such user selectable parameters/criteria can include those listed above, e.g., can include but are not limited to elevation, typical roadway speeds, etc. For example, the user may want to avoid roads which are typically traveled by motor vehicle faster or slower than the user prefers. That is, the program instructions can take into account the relative difference between interstates, highways, city streets, county roads, scenic roads and neighborhood streets). Additionally, the user selectable parameters/criteria can include crime data, street lighting, type of pathways (which could include but are not limited to trails, bike paths, sidewalks, streets and highway), population density, types of areas to avoid (examples of which could include but are not limited to dumps and industrial sites), road construction, safety call boxes, available public telephones, weather predictions, terrain, and routes previously generated and/or traveled. That is, a user may provide input to the program embodiments indicating that a user does not wish to repeat a previously generated route.

As described above, the program embodiments also include the ability for a user to provide input to override one or more initially proposed route and even modify, revise, change, etc. the total distance of the route initially provided as the distance input. By way of example and not by way of limitation, a variance in the total distance may be entered by the user as one of the user selectable parameters/criteria. For example, the program embodiments can execute to receive instructions to generate a route based on a distance input of five miles with the user selectable parameters/criteria input indicating that plus two miles or minus one mile is acceptable (i.e., a tolerance range, including such specifics as "not under a distance of" and "not over a distance of"). In this example the route generating program instructions can execute to first generate a route having a total route distance of five miles. However, if certain other user selectable parameters/criteria include rating factors which override the distance input such that a route of five miles is not practical the program instructions can execute to provide a route which takes into account the other user selectable parameters/criteria and their associated rating factors as well as the user selectable variance in the distance input to generate a route with a total distance within the distance variance. Embodiments also include the ability to suggest routes with total distances approximating but not equal to the distance input if, based on the other parameters/criteria and constraining variables (such as but not limited to fixed road length), a route of the exact distance input is not practical.

As the reader will appreciate, a portable device such as shown in FIG. 2A and including the components of FIG. 3B can include various program embodiments which can execute to interact with GPS input signals to provide position information as the device traverses the route embodiments described above. Additionally, such embodiments can execute instructions to maintain a track log, e.g., where the device actually traveled, and performance information, e.g., how fast the device traversed a particular portion of a route including information on the terrain, elevation, and path composition, etc., of the route among those various portions of the route. Program embodiments can execute to record this information and can execute in interaction with other software to advise a user on training information. For example, a user may subscribe to a service which makes certain program embodiments available where a user can participate in a training program, enter their running habits and interests, e.g., distances, participation in certain races, running gear preference.

Program embodiments can record this information and can execute to provide a user with notifications based on a recorded user profile. Thus, for example, when a user logs in to the subscription service, the program embodiments can execute to provide notifications to the user including relevant race registrations, running club memberships, race gear advertisements, and training instructions pertaining to upcoming race entries and/or other general training preferences. According to some embodiments, these program instructions will execute to automatically select (or automatically generate) a recommended distance to use as the distance input based on a particular training routine relevant to an upcoming race, e.g., whether the training routine is a user requested training routine or subscription service recommended training routine, etc.

For example, program embodiments include instructions which can execute such that a user does not have to enter a distance, but rather the route is generated by receiving a distance, a starting location and possibly other parameters/criteria as determined by the particular training routine. Program embodiments can further execute instructions to compile a user's personal performance history over the course of traversing one or more routes so generated by the program embodiments and can execute to analyze a user's performance vis a vis a given training program, fitness program, etc. As the reader will appreciate a user can input instructions to create their own personalized training routine and the program instructions can execute to track, record performance, and analyze the same. Third party software may also be accessed and interact with the program embodiments described herein to list recommended distance inputs and/or automatically enter these distances into one of the route generation executions. Further, particular fitness program data, track logs, training routines, etc., can be storable in memory and executable by a processor in conjunction with the program embodiments to vary each route generated in order to adjust the distance as well as other factors, including a rating factor, which could include but are not be limited to, elevation, hills encountered on the route and parameters/criteria of other routes traveled or planned. Likewise, the program embodiments can execute to maintain a substantially static distance to a route but still vary each route generated in order to provide variety. According to embodiments the rating factor can be a compilation of possible variables factored together to produce a single or multiple parameters/criteria. Again, these various parameters/criteria can include but are not limited to elevation, hills, heart rate target, obstacles encountered, type of terrain, distance, duration, speed, time, and mode of traveling (e.g., including but not limited to walking, jogging, sprinting, biking, boating, in-line skating, skiing, etc.)

As described above, program embodiments include but are not limited to program instructions which can execute to generate a route based on distance on a portable electronic device, wearable electronic device, a PDA, a computer, a smartphone or any device containing a processing resource and program instructions storable on memory. Different embodiments also include configurations where the route generation is performed on a server or on one other device in communication with another device. By way of example and not by limitation, a distance and starting location and possible other parameters/criteria can be entered on a wearable electronic device and/or smartphone and transmitted to a server where program instructions storable in a memory and executable by a processor within the server generates the route and then transmits a map and/or route instructions back to the wearable electronic device and/or smartphone corresponding to the route generated. In these embodiments different means of communication can facilitate the communication between devices. Example means of communication between devices include those understood by those familiar with the art of electronic data transmission and include but are not limited to radio frequency (RF) in all bands including megahertz and gigahertz, digital communication, analog communication (such as over a publicly switched telephone network), cellular communication, satellite communication, etc. Embodiments, however, are not limited to these examples.

Program embodiments can execute instructions to generate a route to another location, including based on a new distance input, while the user is traversing a previously generated route. For example, a user traversing route 4F may decide to execute program instructions to generate a new route ending at the starting location 460 (which may represent the user's home), based on a new distance input, e.g., a runner may be exhausted, sick, and/or injured and need a shorter, faster, more direct route to the starting location than is available on the route originally generated. Alternatively, in this example, a runner may be full of energy and wish to run an additional five miles, along a most scenic route, and still have a newly generated route return them to the starting location of the original route or an alternative destination. Thus, in one scenario the user may become tired or sick and not want to complete the full distance originally input. In another scenario the user may want to add additional distance to the original distance input traversed before arriving at the starting location or alternative end location.

According to various program embodiments, program instructions can execute to receive and include as selectable parameters/criteria information on several forms of transportation. For example, a user may input parameters/criteria that may include but are not limited to coordinating with bus routes, subways, and roads suitable for walking, etc. in executing program instructions described herein in addition to the distance input. In such scenarios, the program instructions can execute instructions to generate a route, e.g., the route embodiment illustrated in FIG. 4G, where the first leg 471 is traversed by bus, the second leg 473 is traversed by foot (e.g., running, jogging, walking, hiking, kayaking, biking, in-line skating, etc.), and the third leg is traversed by subway. As the reader will appreciate, embodiments can include the use of the above described information corresponding but not limited to, bus routes and schedules, light rail routes and schedules, subway routes and schedule, train routes and schedules, plane route and schedules, taxi routes and stations, shuttle routes and schedules, bike paths, equipment rental stations (e.g. bike rental facilities), etc., all of which can be storable in a memory.

Additionally, program embodiments include instructions which can be executed to generate a route where the distance input is limited to only a portion of a total route, e.g., a portion of a route 473 between a starting location and a destination location. For example, a user may input a distance and one or more selectable parameters/criteria indicating that a distance to be traversed by foot include only a loop around a lake. In this example, a user may have chosen an alternative mean of transportation, e.g. car, bus, etc., to reach the second location 472, e.g., the lake. Thus, the program instructions described herein can execute to generate a route, e.g., as illustrated in FIG. 4G, where the first leg 471 includes travel by car to a lake, the second leg 473 is traversed by a user on foot (e.g., hiking, jogging, skating, etc.) and circles a lake according to a distance input, and a third leg includes travel by car once again, according to a different path as illustrated by the third leg 474, e.g., that passes in proximity to a user selectable location (waypoint) relevant to an errand such as the grocery store.

Figure 5:
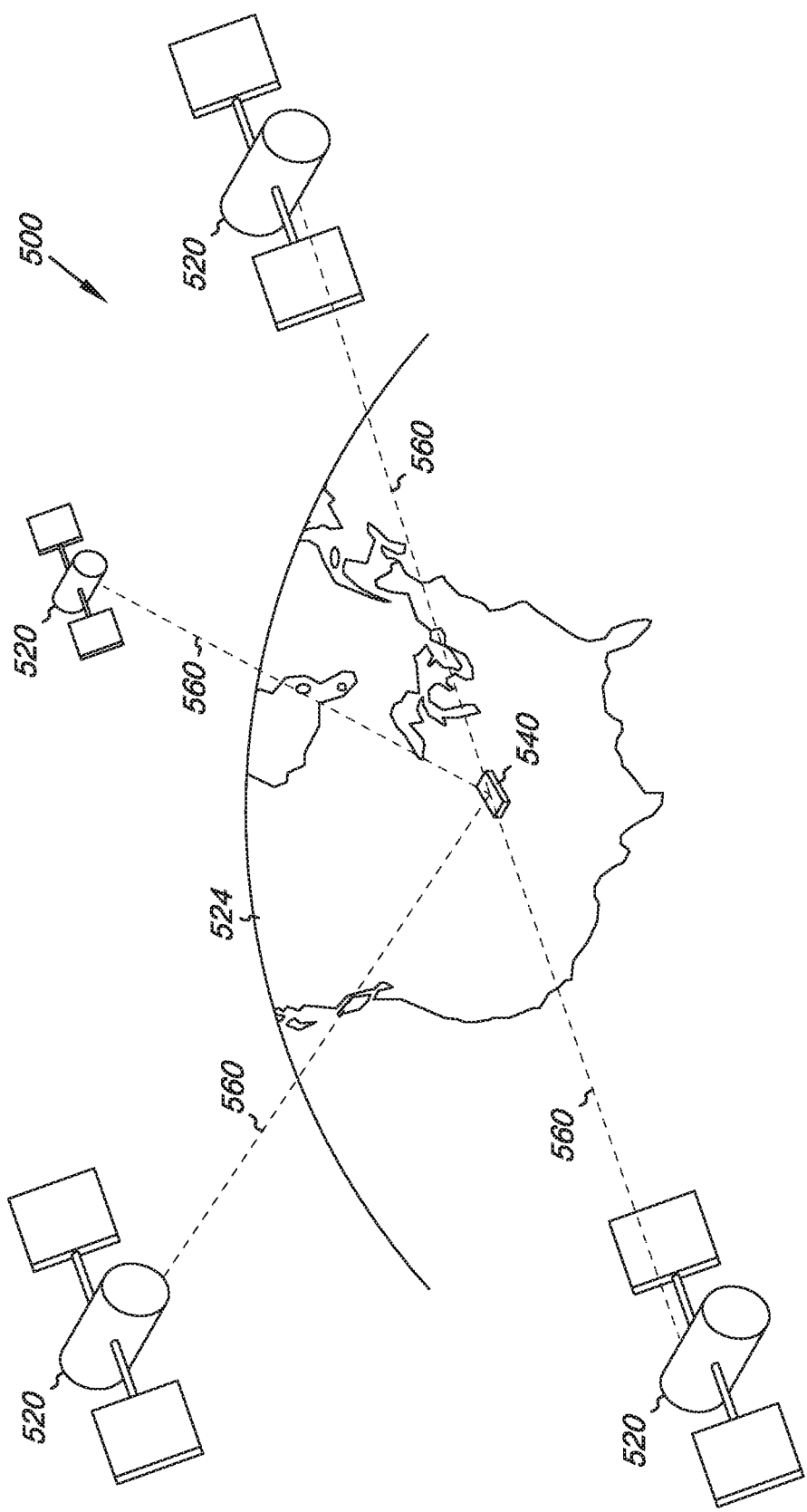
FIG. 5 illustrates a satellite network which can include GPS capabilities and be used in conjunction with the embodiments described herein.

FIG. 5 illustrates a satellite network 500 which can include GPS capabilities and be used in conjunction with the embodiments described herein. As shown in FIG. 5, a number of satellites 520 are in orbit about the earth 524. The satellite network shown in FIG. 5 can include, but is not limited to, GPS, Sirius, XM, Dish, DirecTV, or any other satellite provider network, etc., as the same are known and understood by one of ordinary skill in the art. The orbit of each satellite 520 is not necessarily synchronous with the orbits of other satellites 520 and, in fact, is likely asynchronous. A satellite receiver device 540, which can include a GPS receiver is illustrated receiving satellite signals 560, which can include GPS signals, from the various satellites 520.

These satellite signals 560, continuously transmitted from each satellite 520, utilize a highly accurate frequency standard accomplished with an extremely accurate atomic clock. Each satellite 520, as part of its data signal transmission 560, transmits a data stream indicative of that particular satellite 520, etc. It will be appreciated by those skilled in the relevant art that in GPS embodiments the satellite receiver device 540 must acquire spread spectrum GPS satellite signals 560 from at least three satellites 520 for a GPS receiver device 540 to generate its two-dimensional position by triangulation. Acquisition of an additional signal 560, resulting in signals 560 from a total of four satellites 520, can permit a GPS receiver device 540 to generate its three-dimensional position. As such position information can be provided to the program embodiments described herein.

Additionally, program embodiments according to the present disclosure include the ability to execute instructions to receive content and/or data from one or more satellite networks 520. Indeed, program embodiments can execute instructions to receive different signals from different satellite network providers. For example, one satellite network can provide one or more different kinds of content and/or data, including but not limited to GPS data, software updates, subscriber service information, and cartographic data. The subscriber service information can include information such as running gear advertisements as streaming media, race clubs, training and/or race information, etc. According to some embodiments, program instructions execute to provide the above described information based on, or relevant to, a particular starting location.

As the reader will appreciate, content and/or data available from a satellite network 520, a cellular network and/or other network (not shown) can include positioning data, analog data, digital data, audio, video, cartographic data, directory information, news, entertainment, weather information, communications data, etc. Program embodiments according to the present invention can execute instructions to receive and use as parameters/criteria all such satellite provided information.

Figure 6A:
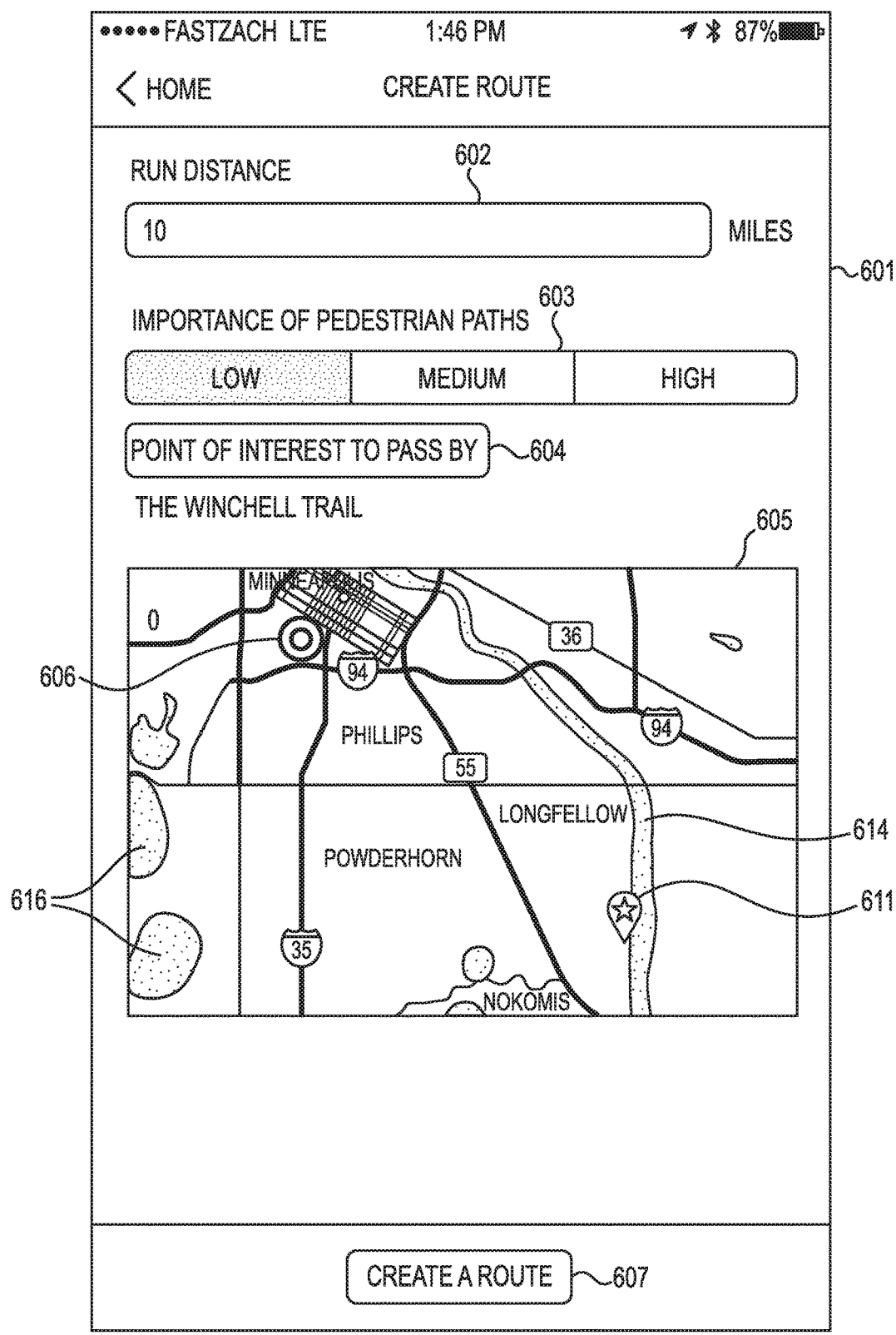
FIGS. 6A-6E illustrates a series of screenshots in accordance with the present disclosure.

FIG. 6A illustrates an example screenshot as can be presented to a display of a device in accordance with embodiments of the present disclosure. According to some embodiments, program instructions may be downloaded as an application and stored on a memory of a wireless, portable electronic device, e.g., a wearable electronic device and/or smart phone. The portable electronic device can have a display 601 and a processing resource, as the same have been described above. The processing resource can execute instructions to present a sequence of displays, such as the one shown in FIG. 6A, according to the execution various program instructions which can be actuated according to various input to the program instructions. The various input can be provided by voice command activation, display contact, e.g., via touch to a touch sensitive display, and/or other function key activation, etc.

As shown in FIG. 6A, the example screenshot on the display 601 can include a field 602 to receive an input related to a distance (e.g., length) of a route request. The example of FIG. 6A illustrates a run distance in input field 602. Embodiments, however, are not limited to running and cycling; walking, hiking, waterway routes, etc., are also considered within the scope of embodiments described herein. FIG. 6A further illustrates additional fields to input various selectable criteria associated with a route request. For example, a field 603 is shown in FIG. 6A to select and rank (e.g., low, medium, high) the importance of utilizing pedestrian pathways as a criteria in generating a route. The example illustrated by field 603 is one just one example a plurality of a selectable set of criteria that may be received as input to a display 601 of a device in accordance with embodiments described herein. Other examples for the selected set of criteria received as input to a display on a device for generating a route include criteria selected from a preference for routes which utilize trails, pass through parks, pass by bodies of water (e.g., lakes, rivers, streams, ponds, etc.), have a certain terrain, etc. In some embodiments, the selected set of criteria can include a preference for "currently" popular routes (e.g., lots of people are there right now), a preference for safety call boxes, lighting and low crime, etc.

Further, a field 604 is provided in the example of FIG. 6A for selecting a point of interest (POI) to pass by. As used herein a POI is intended to be a separate input, like the distance input, from the selected set of criteria provided as an input at field 603. As used herein, a POI can be provided as an additional criteria to generating a route. As used herein, a POI may be a significant landmark, a historical site, a designated municipal attraction, a famous artistic work, etc. As used herein, reference to a POI is intended to be different from the above referenced selectable set of criteria received as inputs. For example, the above mentioned selected set of criteria received as input to a display on a device for generating a route include criteria selected from a preference for routes which utilize trails, pass through parks, pass by bodies of water (e.g., lakes, rivers, streams, ponds, etc.), have a certain terrain, etc., and/or are a selection of a geographic feature which may be particularly interesting and/or useful to a user of a generated route who is traversing the generated route in a non-motorized manner, e.g., by foot and/or bicycle.

Such a distinguishing selectable set of criteria is also particularly relevant to health and wellness applications, and nature and travel applications involving new, off-road areas. It is further noted that as used herein, a geographic feature is intended to be distinguished from a geographic region. As used herein, a geographic region is intended to mean a geographic area relative to cartographic data. In contrast, a geographic feature, as used herein, is intended to mean an actual, particular, natural geographic feature such as a hillside, a mountain, a park, a body of water (e.g., lake, river, stream, pond, ocean, etc.), a certain terrain, etc. A location input selection as used herein may include any of the above.

As shown in the example of FIG. 6A, location relevant cartographic data 605 is presented on the display 601. A location 606 of the device is presented on the location relevant cartographic data 605. As described herein, program instructions can execute to receive location information from a GPS receiver on the device and to present the location 606 on the location relevant cartographic data 605. Alternatively and/or additionally, the program instructions can execute to receive location information using information from a wireless access point communicating with the device in order to present the location 606 on the location relevant cartographic data 605. In other embodiments, a location 606 may be provided as input by a user through touchscreen input, etc.

A point of interest (POI) 611, received as input to field 604, is additionally presented on the location relevant cartographic data 605 on the display 601. FIG. 6A further illustrates geographic features, as the same have been defined herein, of a river 614 and lakes 616 as presented on the location relevant cartographic data 605. Program instructions can execute in response to actuation of field 607 on the display 601 to generate, e.g., create, a route based on the inputs received to the device through the user interface (UI) of the display 601. It is also noted that a HOME field on the screenshot of FIG. 6A may be actuated to return to a home screenshot through which a user can provide input to the device in order to provide user identification (email and password) information to authenticate themselves and request authorization for use of the program instruction embodiments described herein.

Figure 6B:
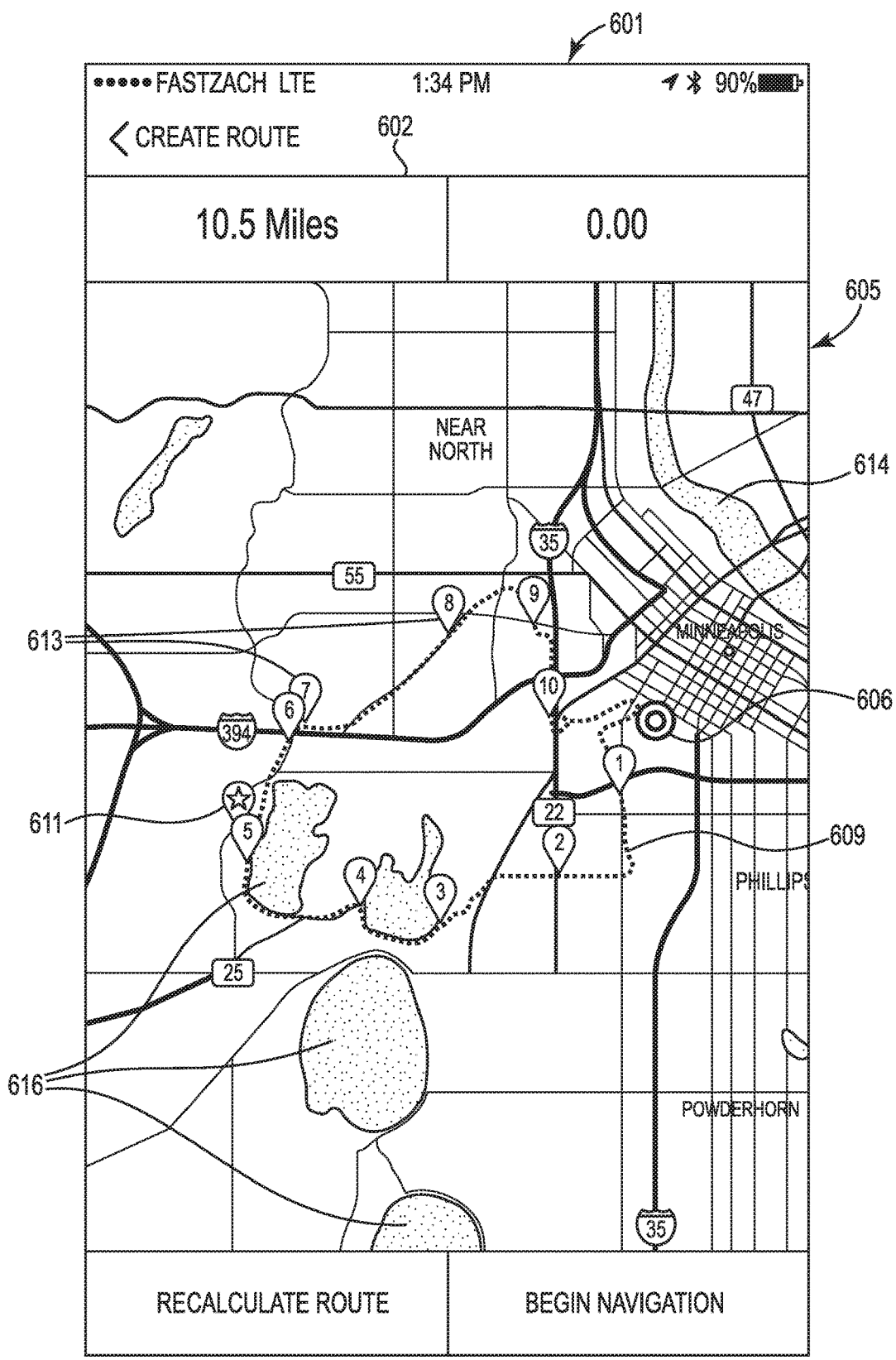

FIG. 6B illustrates an example screenshot of a generated route 609 as can be presented to a display 601 of a device in accordance with embodiments of the present disclosure. As shown in FIG. 6B, the generated route 609 has a length, shown in field 602, substantially equal to a received distance input of ten (10) miles. A selected POI 611, received as input to field 604, is included in the generated route and presented on the location relevant cartographic data 605. The generated route begins and ends at a starting location 606 received as location information to the device as described in FIG. 6A. Geographic features of a river 614 and lakes 616, as the same were shown in FIG. 6A, are also presented on the location relevant cartographic data 605. In the example of FIG. 6B, mile markers 613 may also be presented along the generated route 609 on the location relevant cartographic data 605. As shown in the screenshot example of FIG. 6B, program instructions can execute in response to actuation of fields on the display 601 to begin navigation of the generated route 609 and/or recalculate a route through the user interface (UI) of the display 601.

Figure 6C:
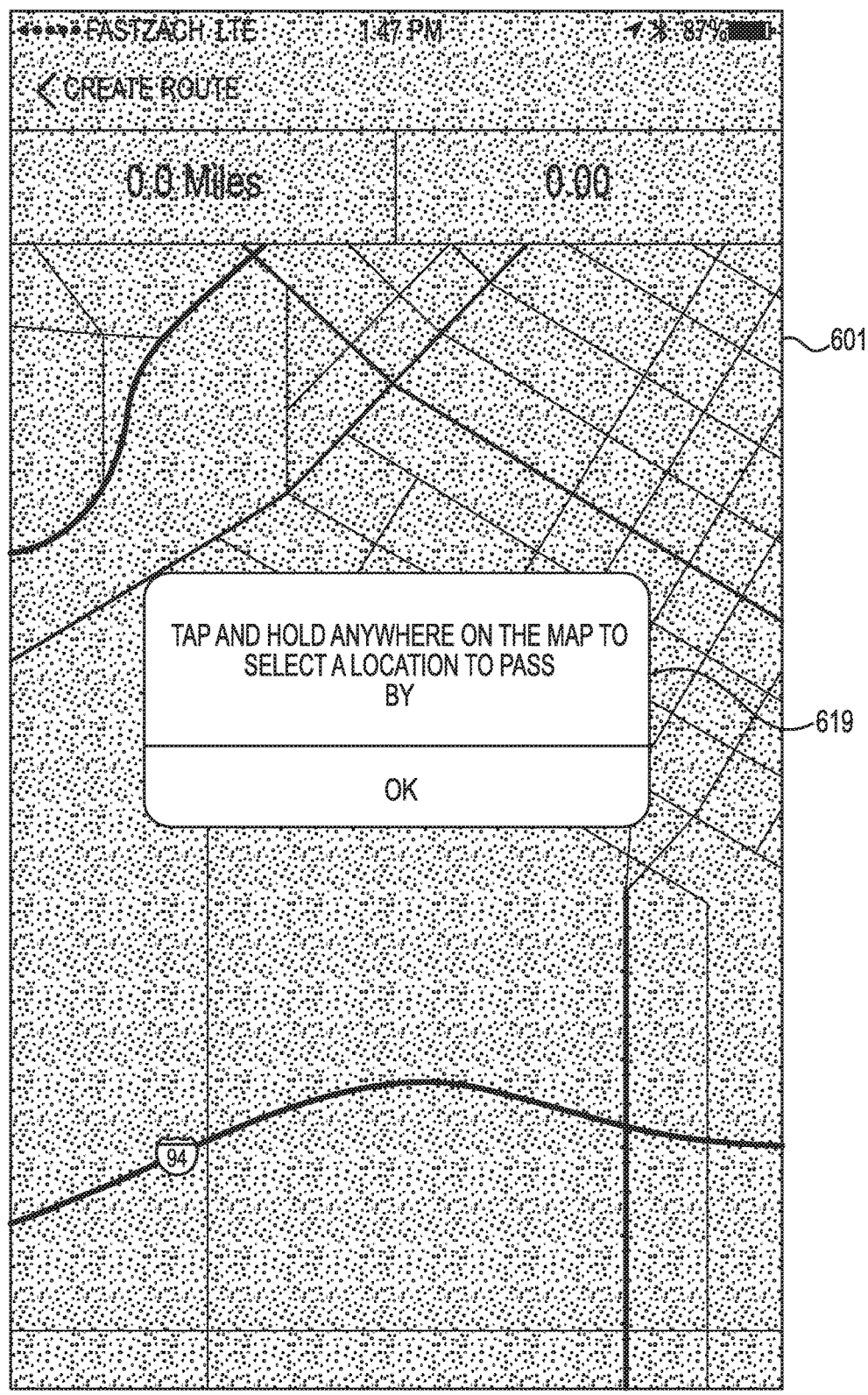

FIG. 6C illustrates one example of viewer instructions 619 which can be presented to the display 601 in response to selecting, for example, recalculate route through the UI of the display. In this example, a user can be instructed to tap and/or hold anywhere on the location relevant cartographic data 605 to provide an additional location input selection. According to embodiments, program instructions can execute to receive this input selection and generate a second route passing by the received input selection to the location relevant cartographic data 605 while maintaining at least one criteria in the second route that was received as input in association with generating the first route. In some embodiments, the program instructions can execute to receive the input selection and generate a second route passing by the received input selection, received to the location relevant cartographic data 605, while maintaining at least a portion of the first route blended into the second route.

In some embodiments the at least one criteria maintained in the second route is a geographic feature received and used as an input to generate the first route. In some embodiments the at least one criteria maintained in the second route is a POI received as an input to generate the first route. In some embodiments, the program instructions execute to always maintain the received distance input and beginning and ending at the starting location in generating the second route unless an input is provided allowing a variance from the received distance input and/or the ending location. In this manner, embodiments described herein provide a configurable route.

Figure 6D:
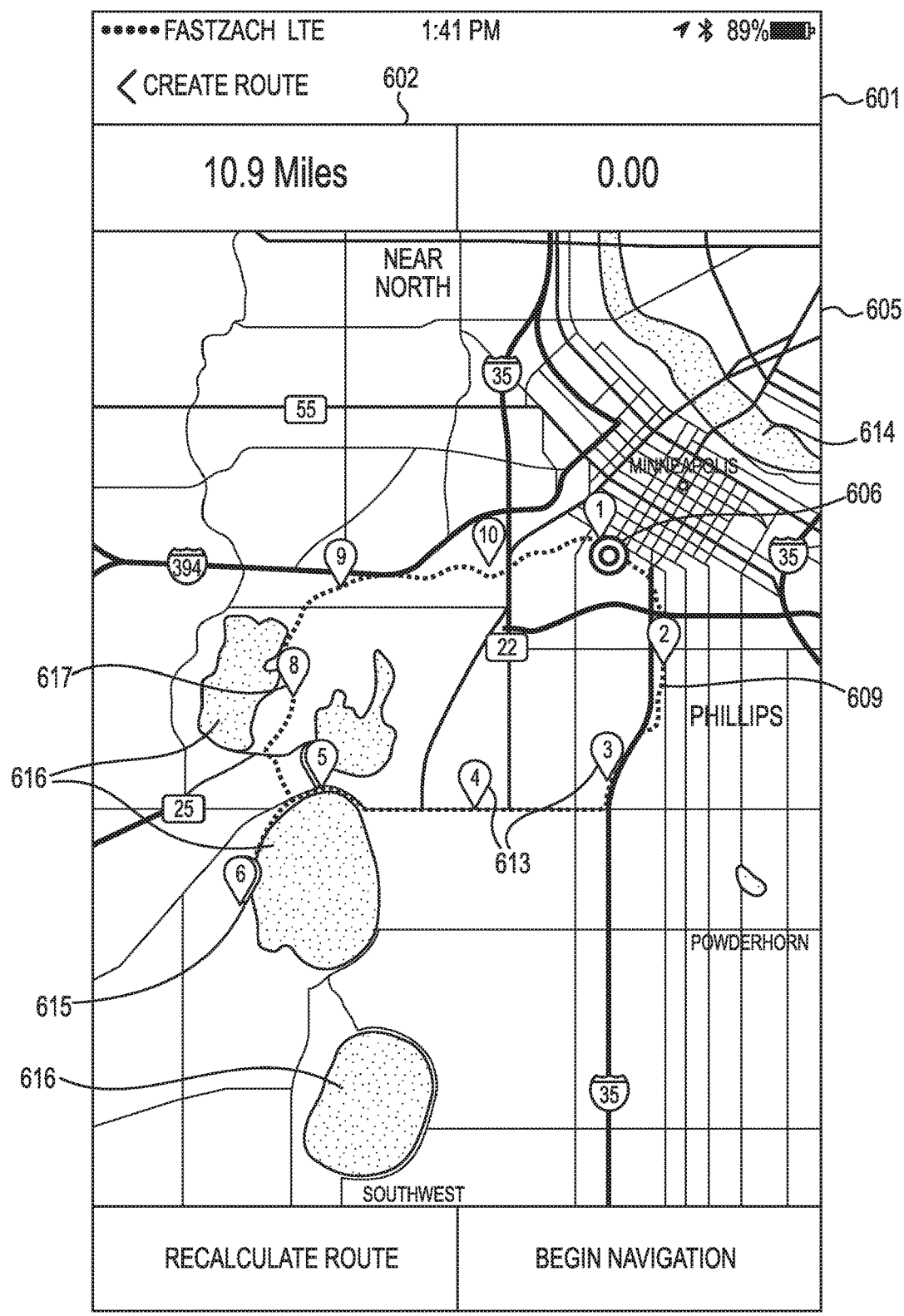

FIG. 6D illustrates an example of a second generated route 609 that begins and ends at the starting location 606 and has a length, shown at 602, of 10.9 miles which is substantially equal to the distance input of 10 miles received in FIG. 6A. In this example the generated second route passes by a received input selection 615 to the location relevant cartographic data 605 located approximately at mile marker 6. Further in this example, the second generated route 609 maintains at least one criteria received as input to generating the first route. In this example, the maintained at least one criteria includes a selected criteria for passing by the geographic feature of a body of water, e.g., the geographic features of lakes 616, while beginning and ending at the starting location 606 and adhering to a received distance input such that a length of the second generated route is substantially equal to the received distance input of 10 miles.

Figure 6E:
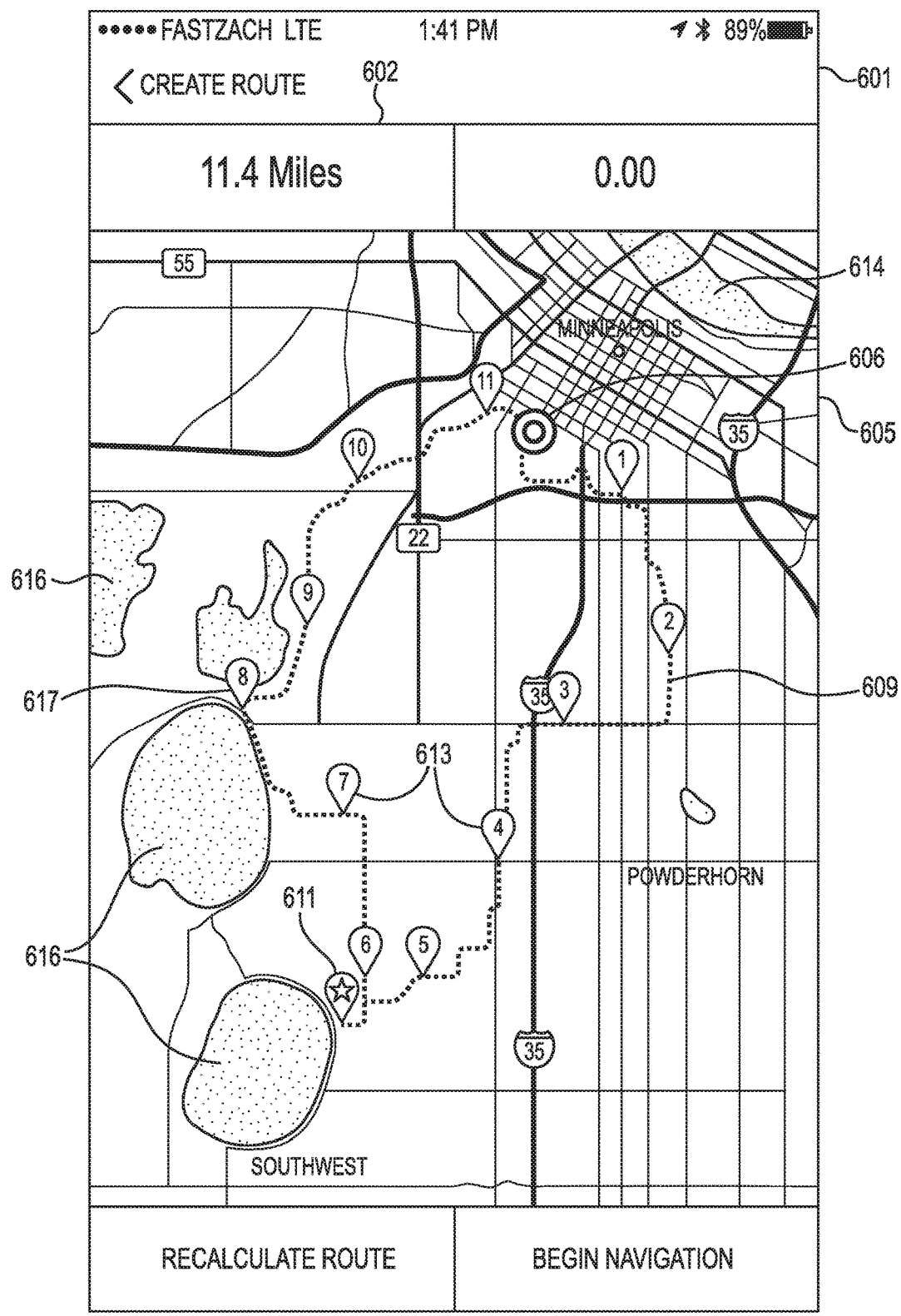

FIG. 6E illustrates an example of a generated second route 609 that begins and ends at the starting location 606 and has a length, shown at 602, of 11.4 miles which is not substantially equal to the distance input of 10 miles received in FIG. 6A. By way of example, and not by way of limitation, a user can define an acceptable variance from a distance input, e.g., +/−one mile, etc. In this example, a user has provided input to allow for a greater variance from the received distance input or can provide a different distance input. Program instructions can execute to comply with either input option. According to embodiments a determination as to whether a length to a generated route is substantially equal to a distance input can be performed by program instructions executing to compare a length of a generated route received to a selectable tolerance threshold for variance from the distance input, e.g., a threshold of +/−one (1) mile, etc.

The example embodiment of FIG. 6E further illustrates the received selection input 611 was a new POI. In the example of FIG. 6E the maintained at least one criteria associated with the generated first route includes a selected criteria for passing by the geographic feature of a body of water, e.g., the geographic features of lakes 616, while beginning and ending at the starting location 606.

Figure 7:
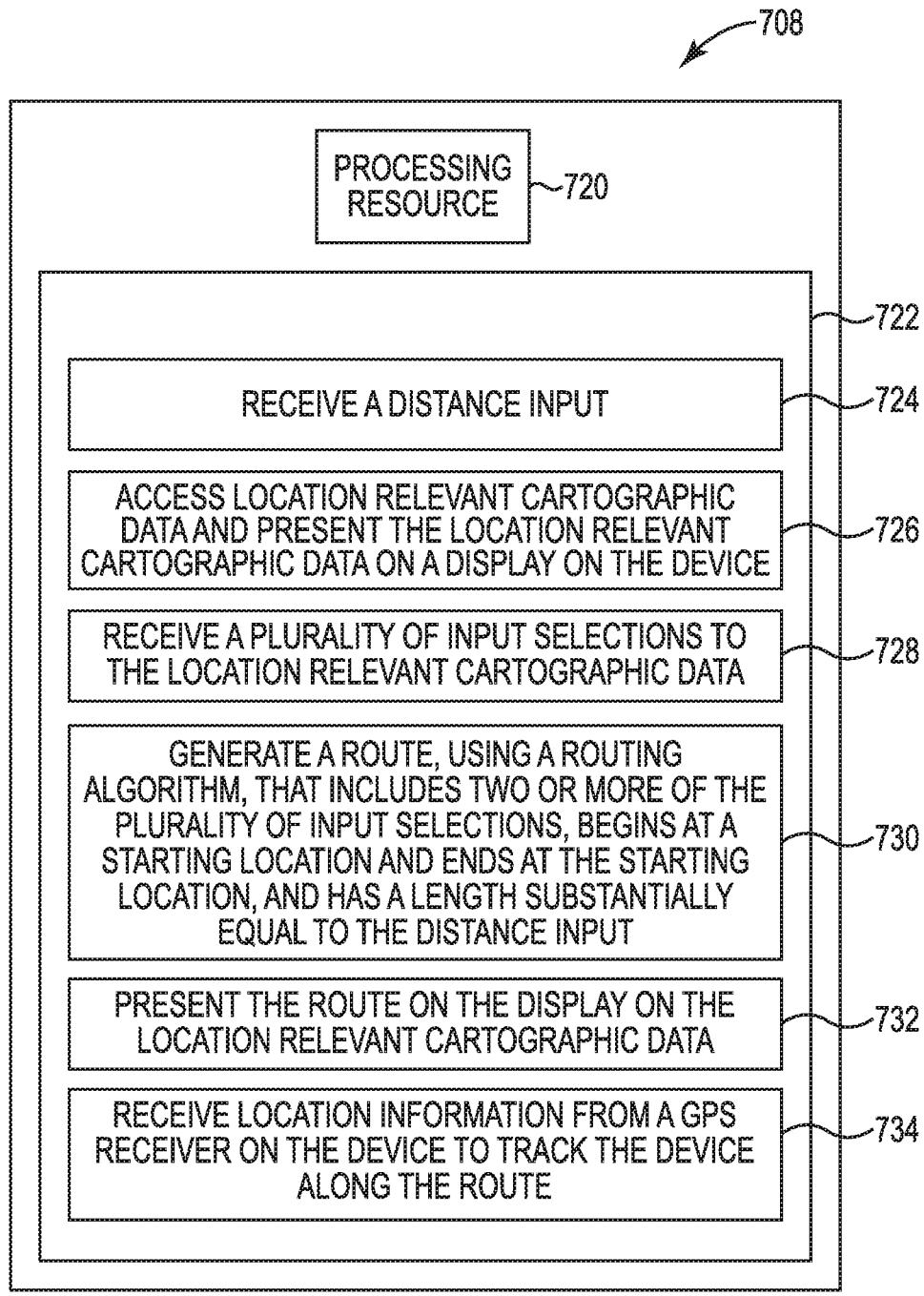
FIG. 7 is a block diagram illustrating an example of program instructions in accordance with the present disclosure.

FIG. 7 is a block diagram illustrating one example of program instructions in accordance with the present disclosure. The embodiment of FIG. 7 illustrates a device 708 including a processing resource 720 coupled to a computer readable medium 722. According to one embodiment, the computer readable medium 722 stores instructions which can be executed by the processing resource to generate a configurable route based on distance in accordance with the present disclosure.

As shown in the example of FIG. 7, the computer readable medium stores instructions to receive a distance input 724. The medium 722 stores instructions executable by the processing resource 720 to access location relevant cartographic data and present the location relevant cartographic data on a display of the device 726. The medium 722 stores instructions executable by the processing resource 720 to receive a plurality of input selections to the location relevant cartographic data 728. In some embodiments, the plurality of input selections are received to the location relevant cartographic data as display contact input to a touch screen user interface (UI) on a display of the device.

As shown in the example embodiment of FIG. 7, the medium 722 further stores instructions executable by the processing resource 720 to generate a route, using a routing algorithm, that includes two or more of the plurality of input selections, begins at a starting location and ends at the starting location and has a length substantially equal to the distance input 730. The medium 722 stores instructions executable by the processing resource 720 to present the route on the display on the location relevant cartographic data 732. And, the medium 722 stores instructions executable by the processing resource 720 to receive location information from a GPS receiver on the device to track the device along the route 734.

Figure 8:
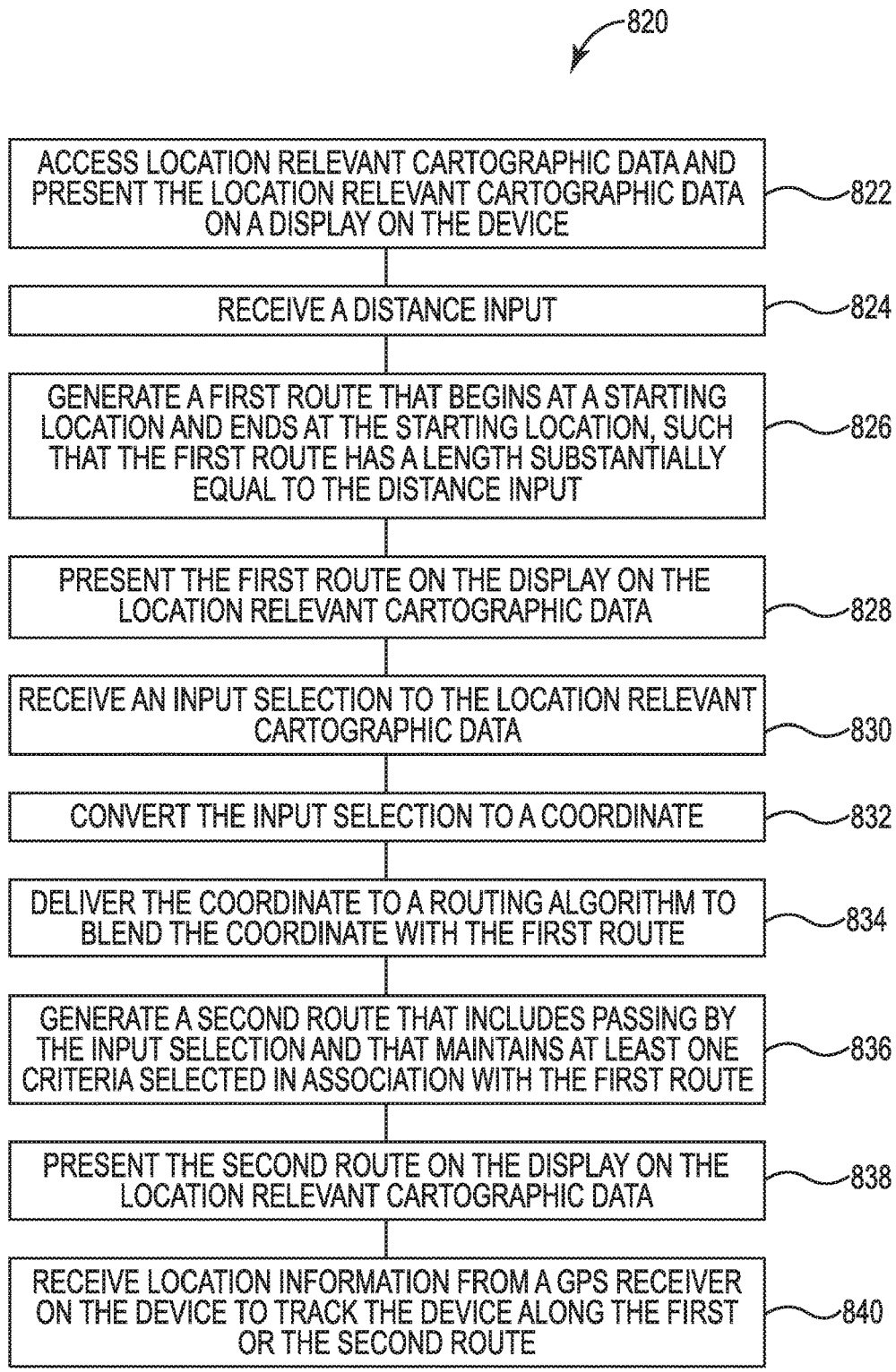
FIG. 8 is a flow block diagram illustrating one example of program instructions executable in accordance with the present disclosure.

FIG. 8 is a flow block diagram illustrating an example of program instructions executable in accordance with the present disclosure. The program instructions may be on a device and stored in a computer readable medium and coupled to a processing resource as shown and described in connection with FIG. 7. As shown in FIG. 8, the example embodiment of program instruction execution includes executing program instructions to access location relevant cartographic data and present the location relevant cartographic data on a display of an electronic device 822. According to embodiments the program instructions may be resident on a portable electronic device and be downloadable to the portable electronic device in a wired and/or wireless manner. For example the program instructions can be downloadable as firmware, applications, and/or a combination thereof, to a smartphone, wearable electronic device, etc.

The example embodiment of FIG. 8 includes executing program instructions to receive a distance input 824. The program instructions are executed to generate a first route that begins at a starting location and ends at the starting location such that the first route has a length substantially equal to the distance input 826. The program instructions are executed to present the first route on the display on the location relevant cartographic data 828. The program instructions are executed to receive an input selection to the location relevant cartographic data 830. In some embodiments, the program instructions are executed to present the first route on the location relevant cartographic data before allowing an input selection to the location relevant cartographic data 830. In some embodiments the input selection is received to the location relevant cartographic data as display contact input to a touch screen user interface (UI) on display of the device.

In the example embodiment of FIG. 8, the program instructions are executed to convert the input selection to a coordinate 832. In some embodiments the program instructions execute to convert the input selection to a latitude and longitude (lat./lon.) coordinate. The program instructions are executed to deliver the coordinate to a routing algorithm to blend the coordinate with the first route 834. In some embodiments, executing the program instructions to blend the coordinate with the first route includes maintaining at least one criteria received as an input in associated with generating the first route. For example the at least one criteria can be a geographic feature such as a lake, river, hillside, terrain composition, etc. In some embodiments the at least one criteria may be that the route utilize at least a portion of a non-motorized pathway, e.g., park, pedestrian and/or bicycle trail, etc. In some embodiments the at least one criteria may be a point of interest (POI) as the same have been defined herein. And, in some embodiments, executing the program instructions to blend the coordinate with the first route includes executing the program instructions to modify a portion of the first route while maintaining at least a portion of the first route in the generated second route.

In the example embodiment of FIG. 8, the program instructions are executed to generate a second route that includes passing by the input selection and that maintains at least one criteria, in addition to the distance input, selected in association with the first route 836. The program instructions are executed to present the second route on the display on the location relevant cartographic data 838. In some embodiments the program instructions are executed to toggle between presenting the first route and the second route on the display on the location relevant cartographic data. The location relevant cartographic data can be cartographic data relevant to a current location of the device. The program instructions are executed to receive location information from a GPS receiver on the device to track the device along the first or the second route 840. The program instructions can further execute to save and retrieve the first and the second routes separate from use of the first and the second routes.

Figure 9A:
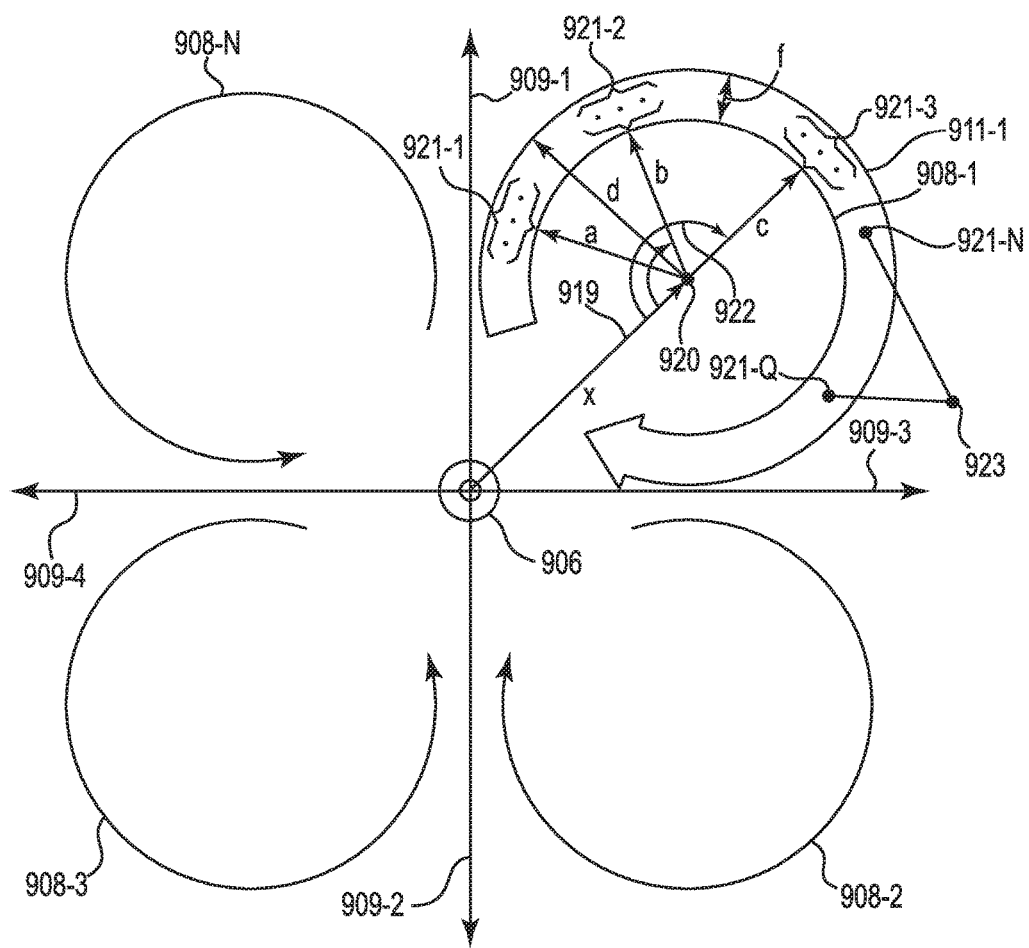
FIG. 9A illustrates an example of program instruction operation when executed by a processing resource to generate a configurable route based on distance in accordance with the present disclosure.

FIG. 9A illustrates an example embodiment for program instruction operation when executed by a processing resource to generate a configurable route based on distance in accordance with the present disclosure. In the example of FIG. 9A program instructions are executed to locate a device 906 and present the location 906 on location relevant cartographic data (e.g., as shown in FIGS. 6A-6E). The program instructions can execute to access location relevant cartographic data. Once accessed the program instructions can be executed by a processing resource to divide up the cartographic data in different searchable regions, e.g., quadrants centered on the location 906 of the device. In the example embodiment shown in FIG. 9A, the program instructions execute to divide the cartographic data into four different searchable regions, illustrated as separated by gridlines 909-1, 909-2, 909-3, and 909-4.

For ease of discussion, in one example the gridline 909-1 can be described as running in a geographic northward direction. The gridline 909-2 would in this example be running in a geographic southward direction. The gridline 909-3 would in this example be running in a geographic eastward direction and the gridline 909-4 would in this example be running in a geographic westward direction.

Figure 9B:
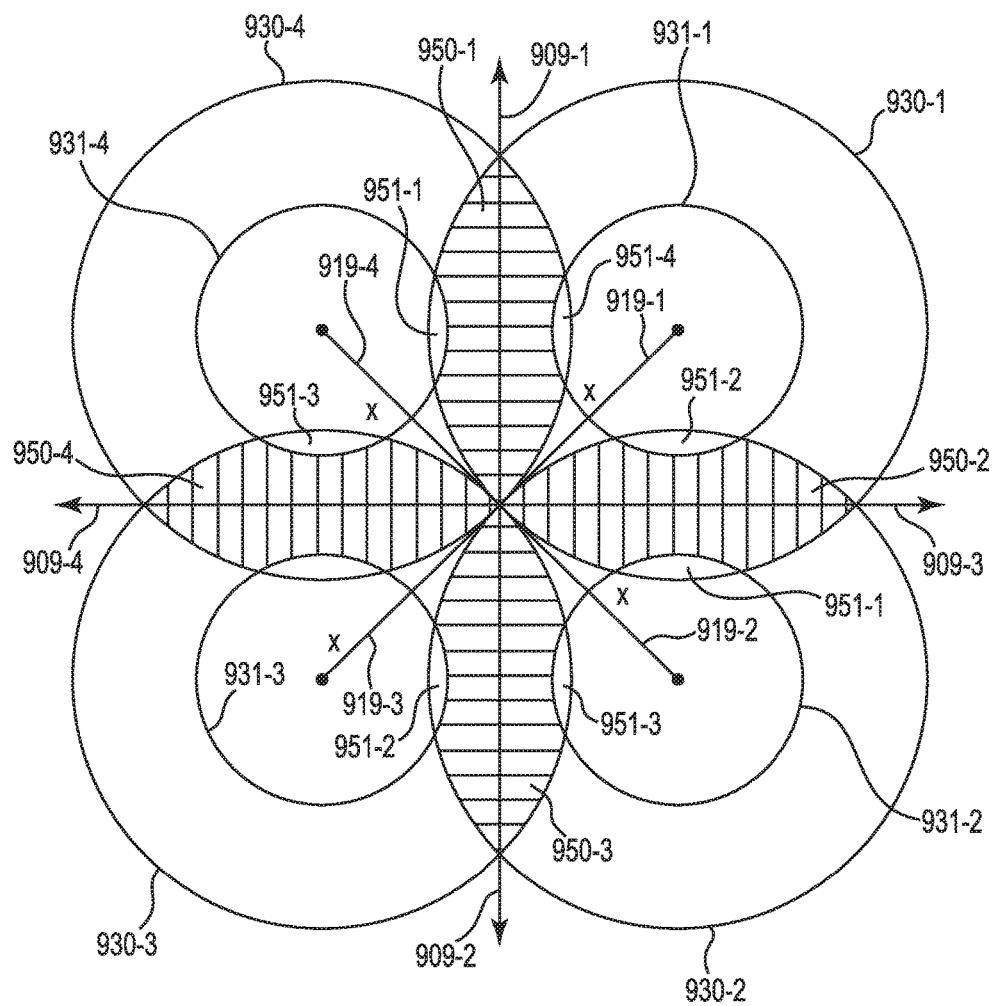
FIG. 9B illustrates another example embodiment for program instruction operation when executed by a processing resource to generate a configurable route based on distance in accordance with the present disclosure.

FIG. 9B illustrates another example embodiment for program instruction operation when executed by a processing resource to generate a route based on distance in accordance with the present disclosure. FIG. 9B is intended to complement the illustration in FIG. 9A. As shown in FIG. 9B, the program instructions execute to select four different directions (also referred to herein as "azimuths") to guide searches and to generate a configurable route based on distance in accordance with the present disclosure. As used herein, the term "azimuth" is intended to mean a horizontal angle measured clockwise from any fixed reference plane or easily established base direction line. For ease of discussion, in one example, the azimuth 919-1 can be described as running in a geographic northeastern direction 45 degrees (45°) clockwise from gridline 909-1. The other azimuths 919-2, 919-3, 919-4 can be described as running in a geographic southeastward (135°) direction clockwise from gridline 909-1, southwestward (225°) direction clockwise from gridline 909-1, and northwestward (315°) direction clockwise from gridline 909-1. As shown in the example embodiment of FIG. 9B, the gridlines 909-1, 909-2, 909-3, and 909-4 in FIG. 9A do not actually divide the different searchable geographic regions. An orientation of the azimuths can be randomly chosen or provided as a function of a ranking of selectable criteria input to generate a configurable route based on distance.

In this example of four different searchable regions, e.g., azimuths, the azimuths can each equally be oriented in another geographic direction and each separated from one another through an angle of approximately ninety (90) degrees. Embodiments are not limited to dividing the cartographic data into four different searchable regions. Program instructions may be executed to create more or fewer than four different searchable regions, with azimuths separated by fewer or more than 90 degrees and/or with azimuths separated by varying degrees of angle to produce differently sized searchable regions.

In this example, once the program instructions have executed to select four different azimuths to create four different searchable directions (e.g., areas), the program instructions execute to choose a distance (x) for the azimuths 919-1, 919-2, 919-3, 919-4 out from the centered location of the device (referred to herein as the "starting location") to approximately the center 920 of the different searchable areas. In various embodiments, the approximate centers 920 of the different searchable areas are encompassed by a circular boundary. The circular boundaries are tangent to the starting location 906. In the example illustrated, an outer radius 930-1, 930-2, 930-3, and 930-4 to a circular boundary will pass through three quadrants defined by the gridlines 909-1, 909-2, 909-3, and 909-4 beginning and ending at the starting location 906. However, the embodiments are not limited to this particular geometry. One advantage to this approach is due to the program instructions being used to generate a route that begins and ends at the starting location 906. For example, executing program instructions to generate a route that begins and ends at a starting location may generate a route that approximates a circular path. In this example embodiment, the distance (x) along an azimuth 919 from the starting location 906 to the approximate center 920 of the circular bounded searchable area is determined based on a distance input received for generating a route.

In some embodiments the distance (x) 919 is a factor of a distance input operated upon by the program instructions. For example, in one example embodiment a distance (x) along azimuth 919 chosen to approximately a center 920 of a searchable area can be a factor that is ⅛ of a received distance input operated upon by program instruction embodiments to generate a route. From the approximate center 920, program instructions can execute to create an inner radius (a) to a first circular arc shown as 908-1 in FIG. 9A and as circle 931-1, 931-2, 931-3 and 931-4 in FIG. 9B. From the approximate center 920 of the bounded geographic region, program instructions can execute to create an outer radius (d) to a second circular arc shown as 911-1 in FIG. 9A and as circle 930-1, 930-2, 930-3, and 930-4 in FIG. 9B that begins at the starting location 906 and ends at the starting location 906. In the examples embodiments the inner radius and outer radius make up an inner perimeter and an outer perimeter, which can be generally referred to as 931 and 930, respectively.

According to embodiments, neither an inner radius (a) nor an outer radius (d) are limited to being a constant distance from the approximate center 920 but rather the program instructions can execute to allow a first variation threshold from the approximate center 920 for a radius of the inner arc 908-1 and a second variation threshold from the approximate center 920 for a radius of the outer arc 911-1. Thus in the example illustration of FIG. 9A, another inner radius (b), taken at a different particular angle to a line joining the approximate center 920 to the starting location 906, can be a different length within the first variation threshold from a length of inner radius (a), taken at a different particular angle to the line joining the approximate center 920 to the starting location 906. Similarly, a complementary outer radius to an outer arc 911-1 passing through the angle taken at inner radius (b) can be determined by the executing program instructions according to a second variation threshold from the approximate center 920 and be a different length within the second variation threshold from a length of outer radius (d). According to embodiments, the program instructions can execute to allow for a first and second, inner and outer, radius variation threshold around an inner arc 908-1 and outer arc 911-1 determined by the executing program instructions to begin and end at the starting location 906. As such an inner radius (c) at yet another angle 922, e.g., shown in a clockwise angle, but not limited thereto, taken with a line joining the approximate center 920 to the starting location may be different from both an illustrated inner radius (a) and inner radius (b).

The effect of program instructions executing to create an inner arc 908-1 in FIG. 9A and 931-1, 931-2, 931-3, 931-4 in FIG. 9B and outer arc 911-1 in FIG. 9A and 930-1, 930-2, 930-3, 930-4 beginning and ending at the starting location 906 is to create a doughnut shaped boundary having a width (f) which may vary within a third variation threshold due to variations within the inner and outer radius variation thresholds from the center 920. In some embodiments the inner radius from the center 920 is chosen such that the width (f) is approximately ¼ of a diameter to the outer arc 911-1 in FIG. 9A and outer circles 930-1, 930-2, 930-3, 930-4 in FIG. 9B beginning and ending at the starting location 906, e.g., a width (f) that is approximately ¼ of a diameter of the circular searchable area.

As shown in the embodiment of FIG. 9B, a resulting doughnut shaped boundary defined by outer circles 930-1, 930-2, 930-3, 930-4 beginning and ending at the starting location 906 passes through three quadrants defined by the gridlines 909-1, 909-2, 909-3 and 909-4 around a particular azimuth 919-1, 919-2, 919-3, and 919-4 direction. In the example embodiment of FIG. 9B, the resulting outer circles 930-1, 930-2, 930-3, 930-4 create an area of shared overlap 950-1, 950-2, 950-3 and 950-4 to the doughnut shaped searchable boundaries between neighboring quadrants, as defined by the gridlines 909-1, 909-2, 909-3, and 909-4. Further, the resulting inner circles 931-1, 931-2, 931-3, 931-4 define the extent of a doughnut shaped boundary such that an outer circle 930-1, 930-2, 930-3, 930-4 to a doughnut shaped boundary from a neighboring quadrant may extend to define a searchable area in an adjacent quadrant that is not encompassed in a defined searchable area of the doughnut shaped boundary centered around the azimuth of that particular quadrant. In FIG. 9B, these extended searchable areas in a neighboring quadrant that are not part of the defined searchable area of the doughnut shaped boundary centered around the azimuth of the particular quadrant are illustrated by areas 951-1, 951-2, 951-3 and 951-4. According to this example embodiment, the executable program instructions produce an even more extensive searchable area to generate configurable routes based on a distance input that begins and ends at a starting location 906, e.g., centered on a device location.

Embodiments are not limited to a doughnut shaped geometry. Rather the term doughnut is used merely to aid in understanding a shape to bounding arcs 908-1 and 911-1 in FIG. 9A and inner circles 931-1, 931-2, 931-3, 931-4 and outer circles 930-1, 930-2, 930-3, 930-4 beginning and ending at the starting location 906 as created by executing program instruction embodiments of a particular searchable area oriented around an azimuth.

As shown in the illustration of FIG. 9A, the program instructions are executed to create additional inner and outer circular arcs, referenced for ease of illustration by 908-2, 908-3 and 908-N, in each of the different searchable geographic regions. In this example, inner and outer arcs represented collectively by singular arc 908-2 would still have a doughnut shaped boundary with a width which may vary and which would begin and end at the starting location 906 within gridlines 909-3 and 909-2 of a different searchable region. Likewise, inner and outer arcs represented collectively by singular arc 908-3 would also have a doughnut shaped boundary with a width which can vary and which would begin and end at the starting location 906 within gridlines 909-2 and 909-4 of another different searchable region. And, in this example, inner and outer arcs represented collectively by singular arc 908-N would similarly include a doughnut shaped boundary with a width that could vary and which would begin and end at the starting location 906 within gridlines 909-4 and 909-1 of yet another different searchable region. Here, the designator "N" is used since embodiments are not limited to the program instructions executing to create of four different searchable regions.

In the example embodiment of FIG. 9B each of the inner circles 931-1, 931-2, 931-3, 931-4 and outer circles 930-1, 930-2, 930-3, 930-4 beginning and ending at the starting location 906 as created by executing program instruction embodiments of a particular searchable area oriented around an azimuth is illustrated.

According to this example embodiment, once the program instructions have executed to create a doughnut shaped boundary with a width which may vary and which passes through the starting location 906 to define a searchable area, the program instructions can execute to search for points to select within the doughnut shaped boundary at various angle locations for angles between a line formed from points within the doughnut shaped boundary to the approximate center 920 and a line between the approximate center 920 and the starting location 906. According to embodiments, the program instructions execute to select points with the doughnut shaped boundary according to a selected set of criteria received as inputs for generating a route. In accordance with embodiments of this disclosure, the selected set of criteria received as inputs for generating a route include criteria selected from a preference for routes which utilize trails, pass through parks, by bodies of water (e.g., lakes, rivers, streams, ponds, etc.), are pedestrian paths, have a certain terrain, etc.

This is illustrated most easily in reference to FIG. 9A, but applies equally to the embodiment illustrated in FIG. 9B. In reference to FIG. 9A, the program instructions can execute to compare and evaluate a first set of points 921-1, located within the doughnut shaped boundary at a randomly chosen first angle between a line formed to the first set of points' 921-1 location from the approximate center 920 and a line between the approximate center 920 and the starting location 906. The program instructions are executed to compare and evaluate information on the first set of points 921-1 as may be accessed by the program instructions from a geographic database having information on the first set of points. For example, the geographic data can be stored in a geographic information system (GIS) database and the program instructions can execute to retrieve information on points within the doughnut shaped boundary. Embodiments, however, are not limited to the GIS example.

The program instructions are executed to compare and evaluate the received information on the first set of points 921-1 with the received selected set of criteria for generating a route. For example the program instructions can execute to evaluate whether the one or more of the first set of points 921-1 meet a threshold for being a point on a trail, a point in a park, a point near a body of water (e.g., lake, river, stream, pond, etc.), a point on a pedestrian path, a point matching a certain terrain criteria, etc. Each of the received selected set of criteria may be ranked and each of first set of points may be compared according to such a ranking to select one or more of the first set of points 921-1, or none of the first set of points 921-1 if none of the first set of points 921-1 meet a threshold associated with the received set of criteria. As used herein, the term "evaluate" is intended to mean determine a significance or worth and the term "compare" is intended to note a dissimilarity or similarity between.

According to embodiments, the program instructions can execute to continue this process of randomly selecting a next set of points with the doughnut shaped boundary at a randomly chosen angle and evaluating and comparing the next set of points, e.g., 921-2, 921-3, to select one or more of the next set of points, 921-2, 921-3, or none. As this process is randomly followed the program instructions may execute to select a number of points dispersed at randomly chosen angles throughout a path through the doughnut shaped boundary, passing through the starting location 906, in order to generate a route that begins and ends at the starting location.

A number of iterations may be performed in this process, and in some instances a set of points selected at a given location in the doughnut shaped boundary may be determined to be too densely grouped according to a threshold number or criteria for the number of points chosen in one area of the doughnut shaped boundary. In this case the program instructions can execute to select one or several of the points that are most highly ranked or most closely match the selected set of criteria received as input and discard the others. In another example the evaluation and comparison of points may result in no points being selected as satisfying the selected set of criteria received as inputs for generating a route. In one embodiment, the program instructions can execute to select a particular number of points dispersed throughout the doughnut shaped boundary. For example, the program instructions may execute to select ten (10) approximately, evenly dispersed points throughout doughnut shaped boundary. In this case the program instructions will execute to select the 10 highest ranked matches to the received selected set of criteria which most evenly spread around the doughnut shaped boundary.

As the program instructions execute to repeat this process in iterations throughout each of the different searchable directions, oriented according to selected azimuth directions, the program instructions can execute to select a first set of points, e.g., ten (10), twenty (20), etc., which best match the ranked selected set of criteria, relative to maintaining a received route distance input, and send the first set of points to a routing algorithm. In some embodiments the program instructions execute to convert the first set of points to latitude and longitude coordinates to deliver to the routing algorithm. In some embodiments the program instructions execute to sort the selected first set of points according to a clockwise or counter clockwise order around the doughnut shaped boundary of from the starting location 906 before delivering the set of points to the routing algorithm. The routing algorithm is configured to generate a route based on the distance input, beginning and ending at a selected starting location and using the first set of points. The program instructions execute to receive the return generated route to a device, on which the program instructions are executing, for use in navigating a generated route. The program instructions can execute to display the route on location relevant cartographic data on a display on the device.

Advantageously the program instructions described herein are not constrained to roadways and/or paved streets. Thus, unlike previous, motorized vehicle navigation systems, the embodiments described herein are not dependent on a cost/node analysis approach of traversing a road segment to an intersection and then next evaluating a cost associated with forking in any particular direction at the intersection. Also, unlike previous, motorized vehicle navigation systems, the embodiments described herein are not dependent on a weighting factor, influencing the route toward a particular direction, in order to create a route that arrives at a "different" destination from the starting location. Instead, the routing algorithm receives the selected set of points chosen by the executing program instructions and incorporates those selected points into a generated route which can include non-motorized paths such as pedestrian, park, trail and body of water proximate portions that match the received selected set of criteria for generating the route.

At this point a user can select to begin navigating the route and be presented with visual and/or audible guidance to traverse the generated route. Additionally, however, according to embodiments the program instructions can execute to receive additional location information inputs to modify and configure the generated route further to create a configurable route. As an example, the program instructions can execute to receive an additional location input selection associated with a geographic feature presented on the location relevant cartographic data on the display that is visually relative to the generated route. This additional location input selection can be received as a display contact through a touch sensitive display as described above and/or through voice commands. The input selection can be to a geographic feature such as a trail, park, body of water, etc. visible on the location relevant cartographic data.

According to embodiments the program instructions can execute to deliver the input selection as an additional point to the routing algorithm to generate a second route passing by the received input selection while maintaining at least one criteria associated with the first generated route.

In the example illustrated in FIG. 9A, this is illustrated at point 923. In some embodiment the program instructions can execute to shift the gridlines bounding a different searchable geographic region 909-1, 909-2, 909-3, 909-4 such that the received input location is within doughnut shaped boundary created by the inner arc 908-1 and the outer arc 911-1. In other embodiments the program instructions can execute to allow the routing algorithm to join a location, e.g., coordinate, of the input selection illustrated by point 923 to the next nearest selected points 921-N and 921-Q located within the doughnut shaped boundary if doing so maintains a length of the generated route substantially equal to the received distance input within a threshold variance tolerance, e.g., +/−one (1) mile. In other embodiments the program instructions can execute to discard points within the doughnut shaped boundary and to join a coordinate of the input selection illustrated by point 923 to others if doing so maintains a length of the generated route substantially equal to the received distance input within a threshold variance tolerance, e.g., +/−one (1) mile. Embodiments, however, are not limited to these examples. A user may provide a different input to allow a new threshold variance tolerance and/or provide a new distance input.

Figure 10:
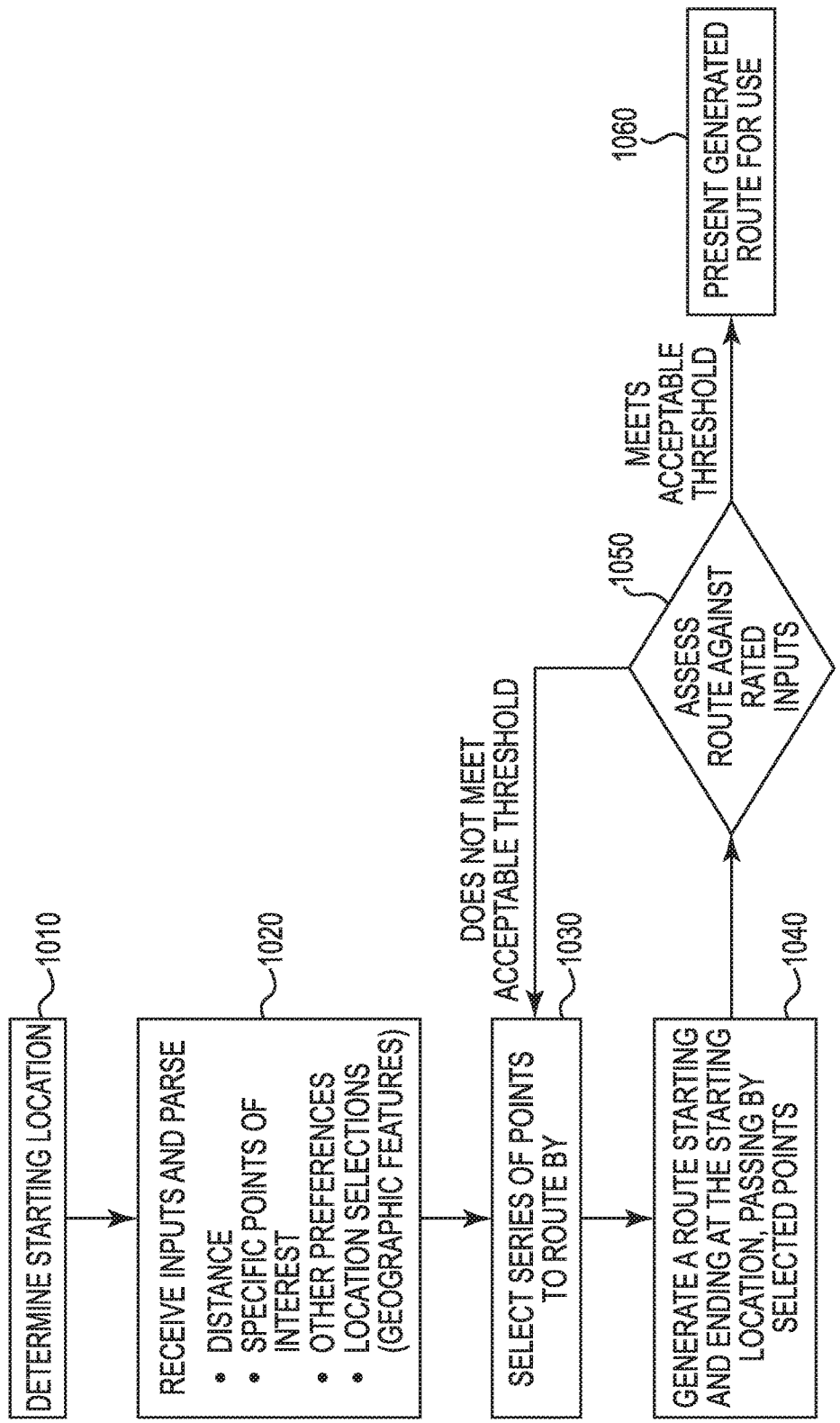
FIG. 10 is a flow diagram illustrating an example of program instructions executable in accordance with the present disclosure.

FIG. 10 is a flow diagram illustrating an example of program instructions executable in accordance with the present disclosure. The program instructions may be on a device and stored in a computer readable medium and coupled to a processing resource as shown and described in connection with FIG. 7. In the example of FIG. 10, the program instructions are executable to determine a starting location 1010. As described herein, in some embodiments the program instructions execute to determine a starting location based on location information received from a GPS receiver on the device. In other embodiments the program instructions execute to determine a starting location based on location information received from a wireless access point connected to the device and/or user input of a starting location to a device.

As shown in FIG. 10, the executable program instructions includes program instructions executable to receive and parse input to a device 1020. As described herein, the inputs can include a distance input, specific points of interest, other preferences (e.g., the selectable set of criteria discussed herein such as geographic features (hillsides, terrain composition, parks, bodies of water), non-motorized trails (pedestrian and bicycle trails)), and location selections which may be any of the above, e.g., may be additional geographic features. According to embodiments, the term "parse" as used herein is intended to mean executing instructions to evaluate and compare the inputs to a ranking of the inputs in order of importance and for relevance to achieving a configurable route based on distance.

At 1030, the program instructions are executable to select a series of points, e.g., a threshold number of 10, 20, etc. The program instructions can execute to select the series of points by evaluation and comparison as those functions have been defined herein. According to embodiments the program instructions can execute to generate a route starting and ending at the starting location, passing by the selected points, and having a length substantially equal to a received distance input 1040. In some embodiments the program instructions execute to convert the selected series of points to latitude and longitude coordinates and deliver the coordinates to a routing algorithm to generate the route.

At 1050, program instructions executable to assess a received route against the ranked inputs. Assessing the received route against ranked input can include ensuring the route begins and ends at the starting location and has a length substantially equal to a distance input within a threshold variation tolerance. If the route does not meet an acceptable threshold, the program instructions can execute to return to block 1030 and select another series of points to route by. If the route does meet an acceptable threshold, the program instructions can execute to present the generated route for use 1060. The sequence shown in the example embodiment of FIG. 10 can be repeated over several iterations. According to embodiments, program instructions can execute to save and retrieve previously generated routes and toggle back and forth between the display of previously generated routes and newly generated routes for selection and use.

Figure 11:
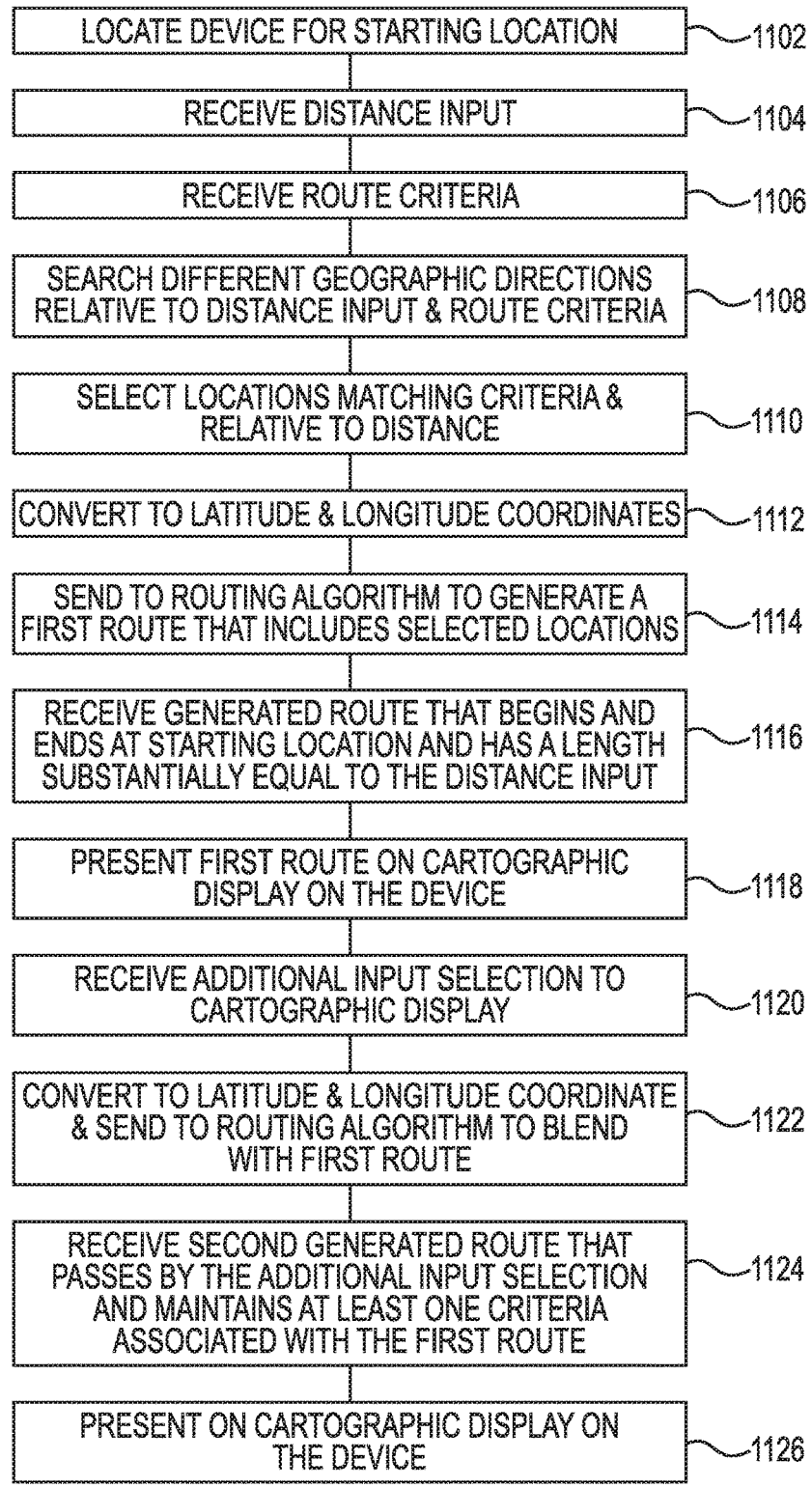
FIG. 11 is a flow block diagram illustrating an example of program instructions executable in accordance with the present disclosure.

FIG. 11 is a flow block diagram illustrating an example of program instruction executable in accordance with the present disclosure. The program instructions may be on a device and stored in a computer readable medium and coupled to a processing resource as shown and described in connection with FIG. 7. As shown in the example of FIG. 11, the program instructions are executable to locate a device for a starting location 1102. According to embodiments, locating a device can include using location information from a GPS receiver on the device. According to embodiments, the program instructions are executed to receive a distance input 1104 and receive route criteria 1106. According to embodiments, the route criteria includes a selected set of criteria such as geographic features, non-motorized paths, and points of interest.

In the example embodiment of FIG. 11, the program instructions are executable to search different geographic directions, from the starting location, relative to a distance input and the received route criteria 1108. The program instructions can execute to select locations matching the received route criteria and relative to the distance input 1110. The program instructions execute to convert the selected locations to latitude and longitude coordinates 1112. The program instructions can execute to send the coordinates to a routing algorithm to generate a first route that includes the selected locations. At 1116 the program instructions can execute to receive a generated first route that begins and ends at the starting location and has a length substantially equal to the distance input. The program instructions can execute to present the first route on a cartographic display on the device 1118.

Further, according to embodiments to generate a configurable route based on distance, the program instructions can execute to receive additional input selection to the cartographic display 1120. The received additional input can be received by display contact through a touch screen user interface (UI) to the display and/or received via audible voice commands received to a speaker of the device. The program instructions execute to convert the additional input selection to latitude and longitude coordinates and send the coordinates to the routing algorithm to blend with the first route 1122. According to embodiments blending the additional input selection coordinates with the first route includes maintaining at least one criteria associated with the generated first route. The program instructions execute receive a generated second route that passes by the additional input selection and maintains the at least one criteria associated with the first route 1124. The program instructions are executed to present the received, generated second route on a cartographic display on the device. The example method embodiment for executing program instructions shown in FIG. 11 can be repeated over several iterations to generate a configurable route based on distance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A portable electronic device for providing a configurable route, comprising:
   a global positioning system (GPS) receiver;
   a processor;
   a memory in communication with the processor;
   a display to display location relevant cartographic data; and
   program instructions storable in memory and executable by the processor to:
      receive a distance input;
      access location relevant cartographic data and present the location relevant cartographic data on the display;
      receive a selected set of criteria;
      search a plurality of regions of the location relevant cartographic data in different bounded searchable directions beginning at a starting location and ending at the starting location and, for each of the different bounded searchable directions, to:
         select sets of points within a given bounded searchable direction; and
         compare selected sets of points with the selected set of criteria to select points that match the selected set of criteria;
      evaluate to select one of the given bounded searchable directions in which selected points most closely match the selected set of criteria relative to the received distance input;

convert to latitude and longitude coordinates the selected points of the selected one of the given bounded searchable directions;

provide the coordinates to a routing algorithm, wherein the routing algorithm executes instructions to generate a first route such that the first route:
- begins at the starting location and ends at the starting location;
- has a length substantially equal to the distance input; and
- incorporates a plurality of the coordinates;

receive an input selection to the location relevant cartographic data;

generate a second route passing by the input selection to the location relevant cartographic data while maintaining at least one criteria associated with the first route; and receive location information from the GPS receiver to track the portable electronic device and present location information on the location relevant cartographic data on the display along the first or the second route.

2. The device of claim 1, wherein the program instructions are executable by the processor to receive a touch sensitive input selection to the location relevant cartographic data on the display.

3. The device of claim 1, wherein the program instructions are executable by the processor to:
receive a plurality of input selections to the location relevant cartographic data;
convert the plurality of input selections to a plurality of coordinates;
deliver the plurality of coordinates to a routing algorithm to blend the plurality of coordinates with the first route while maintaining at least one criteria associated with the first route in the second route; and
generate the second route passing by at least one of the plurality of input selections to the location relevant cartographic data.

4. The device of claim 1, wherein the received input selection is a geographic feature on the location relevant cartographic data and the maintained at least one criteria associated with the first route is a selected point of interest.

5. The device of claim 1, wherein the program instructions are executable by the processor to:
toggle between presenting the first and the second route on the display on the location relevant cartographic data; and
wherein the location relevant cartographic data is cartographic data relevant to a current location of the device.

6. The device of claim 1, wherein the program instructions are executable by the processor to:
convert the received input selection to a latitude and longitude coordinate; and
deliver the coordinate to a routing algorithm to blend the coordinate with the first route.

7. The device of claim 6, wherein the program instructions executable by the processor to blend the coordinate with the first route and generate a second route passing by the input selection are executable to:
modify the first route while maintaining at least a portion of the first route in the second route; and
present the second route on the display on the location relevant cartographic data.

8. The device of claim 1, wherein the program instructions are executable by the processor to save and retrieve the first and the second routes separate from use of the first and the second routes.

9. The device of claim 1, wherein the program instructions are executable to send the first or the second route to another electronic device to share over a social computing network.

10. The device of claim 1, wherein the starting location is an initial location of the portable electronic device as determined by the GPS receiver when the first or the second route is generated.

11. A non-transitory computer readable medium having instructions executable for causing a device to perform a method for a configurable route, wherein the instructions are executable by a processing resource to:
access location relevant cartographic data and present the location relevant cartographic data on a display on the device;
receive a distance input;
receive a selected set of criteria;
search a plurality of regions of the location relevant cartographic data in different bounded searchable directions beginning at a starting location and ending at the starting location and, for each of the different bounded searchable directions, to:
select sets of points within a given bounded searchable direction; and
compare selected sets of points with the selected set of criteria to select points that match the selected set of criteria;
evaluate to select one of the given bounded searchable directions in which selected points most closely match the selected set of criteria relative to the received distance input;
convert to latitude and longitude coordinates the selected points of the selected one of the given bounded searchable directions;
provide the coordinates to a routing algorithm, wherein the routing algorithm executes instructions to generate a first route such that the first route:
- begins at the starting location and ends at the starting location;
- has a length substantially equal to the distance input; and
- incorporates a plurality of the coordinates;

present the first route on the display on the location relevant cartographic data;
receive an input selection to the location relevant cartographic data;
generate a second route that includes passing by the input selection and that maintains at least one criteria selected in association with the first route; and
receive location information from a GPS receiver on the device to track the device along the first or the second route.

12. The medium of claim 11, wherein the instructions are executable by the processing resource to
determine the starting location.

13. The medium of claim 11, wherein the instructions are executable by the processing resource to:
convert the input selection to a latitude and longitude coordinate;
provide the coordinate to a routing algorithm that executes instructions to blend the coordinate with the first route to generate the second route that passes by the input selection within a threshold distance of the input selection; and present the second route on the display on the location relevant cartographic data.

14. The medium of claim 11, wherein the instructions are executable by the processing resource to determine the starting location using location information from a wireless access point connected to the device.

15. The medium of claim 11, wherein:
the at least one criteria includes a point of interest (POI) selected in connection with generating the first route; and
wherein the received input selection is a geographic feature selected by display contact to the location relevant cartographic data on the display.

16. A non-transitory computer readable medium having instructions executable for causing a device to perform a method for a configurable route, wherein the instructions are executable by a processing resource to:
receive a distance input;
access location relevant cartographic data and present the location relevant cartographic data on a display on the device;
receive a selected set of criteria;
search a plurality of regions of the location relevant cartographic data in different bounded searchable directions beginning at a starting location and ending at the starting location and, for each of the different bounded searchable directions, to:
select sets of points within a given bounded searchable direction; and
compare selected sets of points with the selected set of criteria to select points that match the selected set of criteria;
evaluate to select one of the given bounded searchable directions in which selected points most closely match the selected set of criteria relative to the received distance input;
convert to latitude and longitude coordinates the selected points of the selected one of the given bounded searchable directions;
provide the coordinates to a routing algorithm, wherein the routing algorithm executes instructions to generate a route such that the route:
begins at the starting location and ends at the starting location;
has a length substantially equal to the distance input; and
incorporates a plurality of the coordinates; and
present the route on the display on the location relevant cartographic data.

17. The medium of claim 16, wherein the instructions are executable by the processing resource to receive an input selection to the location relevant cartographic data, wherein the plurality of input selections are geographical features on the location relevant cartographic data selected by contact with the display and the instructions are executable by the processing resource to:
convert the input selection to coordinates;
deliver the coordinates as an input to a routing algorithm;
receive a point of interest selection to the location relevant cartographic data;
deliver the point of interest selection as an input to the routing algorithm; and
modify the route to include the point of interest selection and the input selection on the location relevant cartographic data.

18. The medium of claim 16, wherein the instructions are executable by the processing resource to:

receive a plurality of selectable criteria as inputs to the device;
rate the plurality of selectable criteria; and
deliver the plurality of selectable criteria to the routing algorithm, wherein the routing algorithm executes instructions to include two or more of the plurality of selectable criteria in the route.

19. A portable electronic system for configuring a route, comprising:
a wireless enabled wearable device connectable to a network, wherein the device includes:
a global positioning system (GPS) receiver;
a processing resource;
a memory in communication with the processor;
a display in communication with the processor and memory to display location relevant cartographic data; and
program instructions storable in the memory and executable by the processing resource to:
receive a distance input to the device;
receive a selected set of criteria;
search a plurality of regions of the location relevant cartographic data in different bounded searchable directions beginning at a starting location and ending at the starting location and, for each of the different bounded searchable directions, to:
select sets of points within a given bounded searchable direction; and
compare selected sets of points with the selected set of criteria to select points that match the selected set of criteria;
evaluate to select one of the given bounded searchable directions in which selected points most closely match the selected set of criteria relative to the received distance input
convert to latitude and longitude coordinates the selected points of the selected one of the given bounded searchable directions;
provide the coordinates to a routing algorithm, wherein the routing algorithm executes instructions to generate a first route such that the first route:
begins at the starting location and ends at the starting location;
has a length substantially equal to the distance input and
incorporates a plurality of the coordinates;
receive a selection input to the location relevant cartographic data on the display; and
cause the route to
include the selection input to the cartographic relevant data; and
display as a modified route on the location relevant cartographic data; and
receive location information from the GPS receiver to track the device along the route.

20. The system of claim 19, wherein the program instructions are executable by the processing resource to cause the route to be generated based on a selectable set of criteria including pedestrian paths and a selectable rating factor associated with at least one of the selectable set of criteria.

21. The system of claim 19, wherein the program instructions are executable by the processing resource to select the starting point based on current location information received from the GPS receiver.

22. The system of claim 19, wherein the device is connected to a routing algorithm over a wireless network to deliver the distance input and the selection input to the routing algorithm.

23. The system of claim 19, wherein the program instructions are executable by the processing resource to receive an authentication input to the device and to wirelessly provide a confirmation of traversal of the route to a third party over the wireless network.

* * * * *